United States Patent
Redmann

(10) Patent No.: US 9,241,149 B2
(45) Date of Patent: Jan. 19, 2016

(54) SUBTITLES IN THREE-DIMENSIONAL (3D) PRESENTATION

(75) Inventor: William Gibbens Redmann, Glendale, CA (US)

(73) Assignee: Thomson Licensing, Issy les Moulineaux (*) Notice: Subject to any disclaimer, the term of this patent is extended or adjusted under 35 U.S.C. 154(b) by 569 days.

(21) Appl. No.: 13/634,981

(22) PCT Filed: Apr. 1, 2011

(86) PCT No.: PCT/US2011/000590
§ 371 (c)(1),
(2), (4) Date: Sep. 14, 2012

(87) PCT Pub. No.: WO2011/123178
PCT Pub. Date: Oct. 6, 2011

(65) Prior Publication Data
US 2013/0010062 A1    Jan. 10, 2013

Related U.S. Application Data

(60) Provisional application No. 61/319,948, filed on Apr. 1, 2010.

(51) Int. Cl.
*H04N 5/262* (2006.01)
*H04N 13/00* (2006.01)
(Continued)

(52) U.S. Cl.
CPC ............. *H04N 13/007* (2013.01); *H04N 5/262* (2013.01); *H04N 5/278* (2013.01); *H04N 13/0022* (2013.01)

(58) Field of Classification Search
CPC ............ H04N 13/007; H04N 13/0022; H04N 13/0062; H04N 21/4884; H04N 2213/005; H04N 2213/003; H04N 13/0048; H04N 13/004; H04N 13/0055

USPC .................................................... 348/42, 51
See application file for complete search history.

(56) References Cited

U.S. PATENT DOCUMENTS 7,206,029 B2    4/2007   Cohen-Solal
2004/0213542 A1  10/2004  Minami et al.
(Continued)

FOREIGN PATENT DOCUMENTS

CN    1423896    6/2003
CN    1778111    5/2006
(Continued)

OTHER PUBLICATIONS

Search report mailed Jul. 8, 2011.

*Primary Examiner* — Sath V Perungavoor
*Assistant Examiner* — Clifford Hilaire
(74) *Attorney, Agent, or Firm* — Robert D. Shedd; Lily Neff

(57) ABSTRACT

A method and system for preparing subtitles for use in a stereoscopic presentation are described. The method allows a subtitle to be displayed without being truncated or masked by comparing the subtitle's initial footprint with an image display area. If any portion of the initial footprint lies outside the image display area, the subtitle is adjusted according to adjustment information, which includes at least one of: a scale factor, a translation amount and a disparity change, so that the adjusted subtitle lies completely within the image display area. Furthermore, the disparity of the subtitle can be adjusted by taking into account the disparities of one or more objects in an underlying image to be displayed with the subtitle.

7 Claims, 22 Drawing Sheets

(51) Int. Cl.
*H04N 5/278* (2006.01)
*H04N 13/02* (2006.01)

(56) References Cited

U.S. PATENT DOCUMENTS

| | | | |
|---|---|---|---|
| 2010/0220175 A1* | 9/2010 | Claydon | H04N 9/8715 348/43 |
| 2010/0332214 A1* | 12/2010 | Shpalter et al. | 704/2 |
| 2011/0242104 A1* | 10/2011 | Zhang et al. | 345/419 |
| 2011/0292175 A1* | 12/2011 | Suh | H04N 13/0059 348/43 |

FOREIGN PATENT DOCUMENTS

| | | |
|---|---|---|
| JP | 2008167369 | 7/2008 |
| WO | WO2006111893 | 10/2006 |
| WO | WO2008115222 | 9/2008 |
| WO | WO2010010499 | 1/2010 |

* cited by examiner

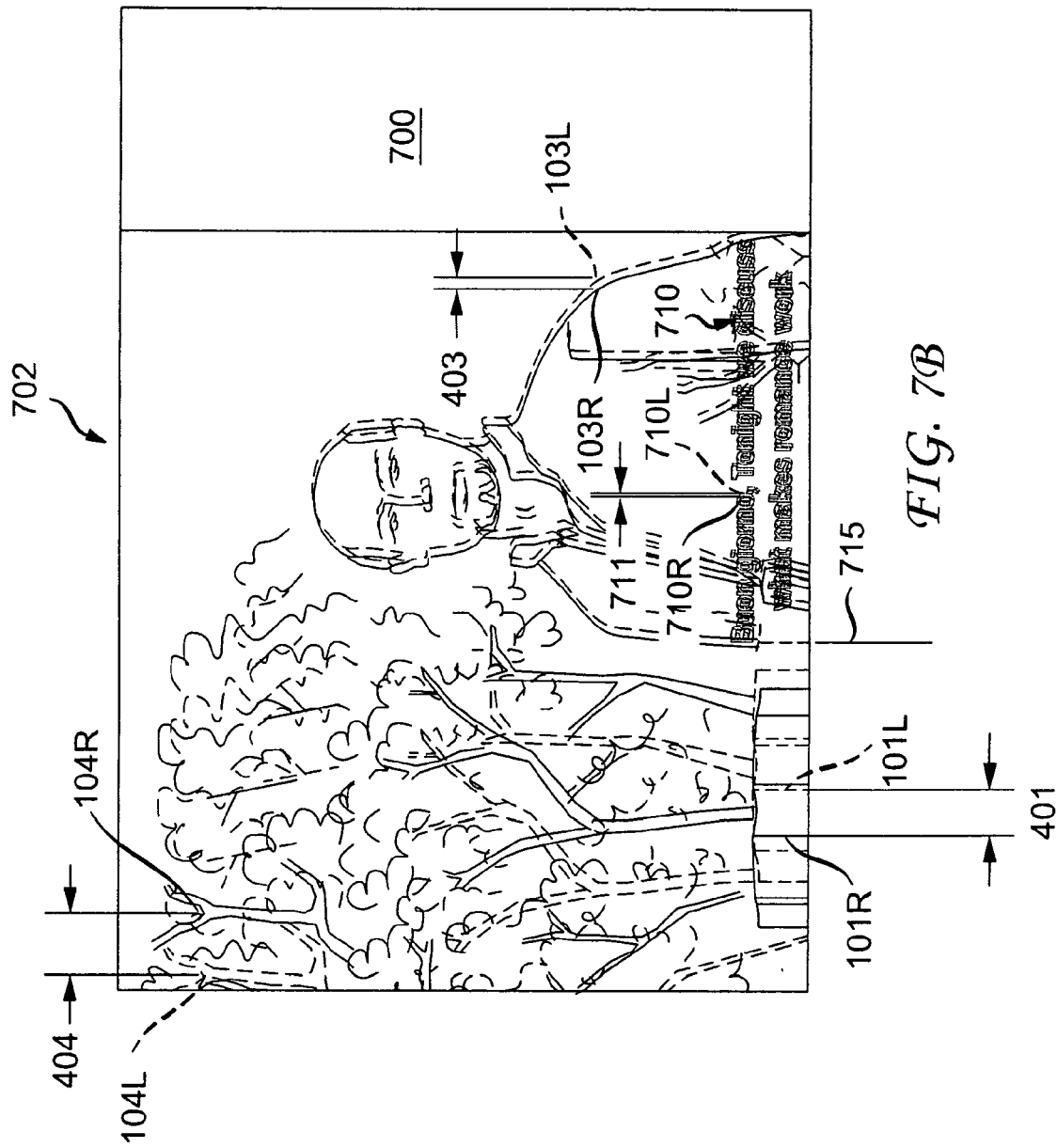

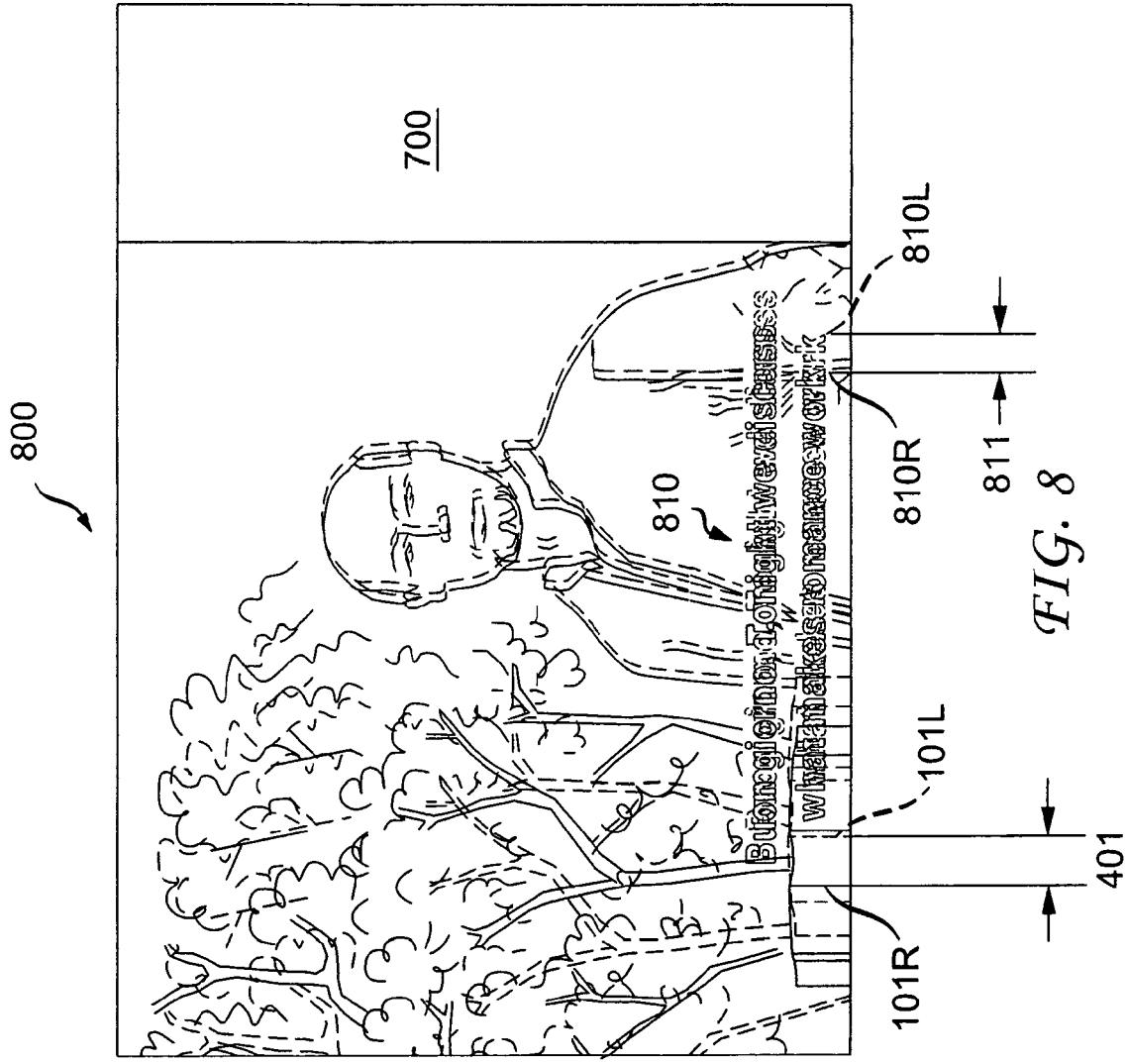

SUBTITLES IN THREE-DIMENSIONAL (3D) PRESENTATION

CROSS-REFERENCE TO RELATED APPLICATION

This application claims the benefit ,under 35 U.S.C. §365 of International Application PCT/US2011/000590 filed Apr. 1, 2011which was published in accordance with PCT Article 21 (2) on Oct. 6, 2011 in English and which claims the benefit of United States Provisional Patent Application No. 61/319,948 filed on Apr. 1, 2010.

TECHNICAL FIELD

The present invention relates to preparing subtitles for use in a stereoscopic presentation.

BACKGROUND

In a three-dimensional (3D) digital cinema theatrical presentation, the masking on the screen may obstruct or encroach on the region in which a subtitle or caption is to have been displayed, thus necessitating a modification to the subtitle, e.g., its position and/or dimensions on the screen. The same situation can arise in a 3D video display, if a full raster of the content or the original subtitle occupies an area larger than a display area of a monitor. In such situations in 3D, not only must the subtitle or caption be adjusted in size or dimensions and/or relocated in a coordinated fashion for each eye's image, but there must also be an accommodation for the 3D content which the caption will overlay, so that the caption does not interfere with apparent depth of elements within the content, nor be unsuitably displayed far into the foreground with respect to the underlying content. The term "apparent depth" is the depth perception by a viewer relative to the screen, caused by the disparity between the left-eye and right-eye images. A 3D presentation is usually constrained to provide apparent depth because viewers at different locations will perceive a different apparent depth for the same element in the image.

In a 3D presentation, the "overlay" or "compositing" of a caption provides that the caption and the associated image or content are combined so as to present the caption, within the image space, readably to a viewer. This necessarily obscures a portion of the image, with the portion of the image that gets obscured being chosen manually (e.g., by an artist or subtitle technician), or in some cases automatically. The caption may be semitransparent in whole or in part.

In the case of 3D, subtitles are generally provided with a specified disparity (i.e., offset between the right- and left-eye subtitles), often measured in pixels, so that the system responsible for rendering the text can render the text with the 3D image content and have the appropriate offset applied between the right- and left-eye subtitles so that they are correctly placed. When the location offset between the right- and left-eye is zero, the subtitle appears to be at the surface of the screen. When the location places the subtitle for the right eye to the right of the subtitle for the left eye, then the subtitle appears to be behind the screen. If the subtitle for the right eye is to the left of the subtitle for the left eye, then the subtitle appears to be in front of the screen.

Various methods and systems for subtitle display have been described by others in commonly-assigned patent applications, e.g., Redmann in published PCT patent application, WO 2010/096030, entitled "Method and Apparatus for Preparing Subtitles for Display" and Izzat et al. in PCT published patent application, WO2008/115222, entitled "System and Method for Combining Text with Three-Dimensional Content". The teachings in both PCT publications are herein incorporated by reference in their entireties.

In general, captions and subtitles in theatrical presentations have different meanings. For example, captions refer to commentary in the language of the primary audio, whereas subtitles are generally in a language other than of the primary audio. However, both are instances of text applied over the main image. Since embodiments of this invention apply equally to captions and subtitles, these terms are used interchangeable in this discussion.

Captions and subtitles are also frequently encountered as either 'open' or 'closed'. Open captions or subtitles are visible to all viewers, and are 'burned-in', that is, made into an inextricable element of a main image, e.g., an image or content for presentation or display. Closed captions or subtitles, however, are not provided as a part of the main image. Instead, they are displayed by the action of the monitor or projector, or the set-top box or server driving the monitor, in conjunction with the display of the main image or content.

In some cases, e.g., in digital cinema presentations, the subtitles or captions are provided with metadata for their placement in the main image. In other cases, e.g., television, the closed captions are provided without placement information and the placement is left up to the presentation system.

Most television systems provide closed captions as a stream of text that is rendered by the display device. In digital cinema systems, captions or subtitles may be provided as timed-text, where text strings to be rendered in a default or explicitly specified and provided font, or they may be provided as still-frame images of the text.

SUMMARY OF THE INVENTION

Embodiments of the present principles provide a method and system for preparing subtitles or captions for stereoscopic presentations. A subtitle can be adjusted in different ways so that it can be displayed within a given image display area without being truncated or obscured. Such adjustments include varying the dimension(s) of the subtitle by applying a scale factor, translating the subtitle in image space, changing its disparity or apparent depth, or combinations thereof. Since disparity adjustment of the subtitle can be done by taking into consideration the disparities of other objects or elements in the underlying image, depth cue conflicts can be minimized, resulting in improved stereoscopic viewing experience.

One embodiment provides a method for preparing subtitles for a stereoscopic presentation, which includes: processing a subtitle according to adjustment information, and compositing the processed subtitle into at least one stereoscopic image to produce at least one transformed stereoscopic image for stereoscopic presentation.

Another embodiment provides a system for preparing subtitles for a stereoscopic presentation, which includes a first processor configured for automatically processing a subtitle according to adjustment information including at least one of: a scale factor, an amount of translation and a disparity change, and compositing the processed subtitle into a stereoscopic image to produce a transformed stereoscopic image for use in the stereoscopic presentation.

BRIEF DESCRIPTION OF THE DRAWINGS

The teachings of the present invention can be readily understood by considering the following detailed description in conjunction with the accompanying drawings, in which:

FIG. 7B shows the stereoscopic view of FIG. 7A with a scaled-down caption;

FIG. 8 shows a caption adjusted to avoid cropping;

To facilitate understanding, identical reference numerals have been used, where possible, to designate identical elements that are common to the figures.

DETAILED DESCRIPTION

Figure 1:
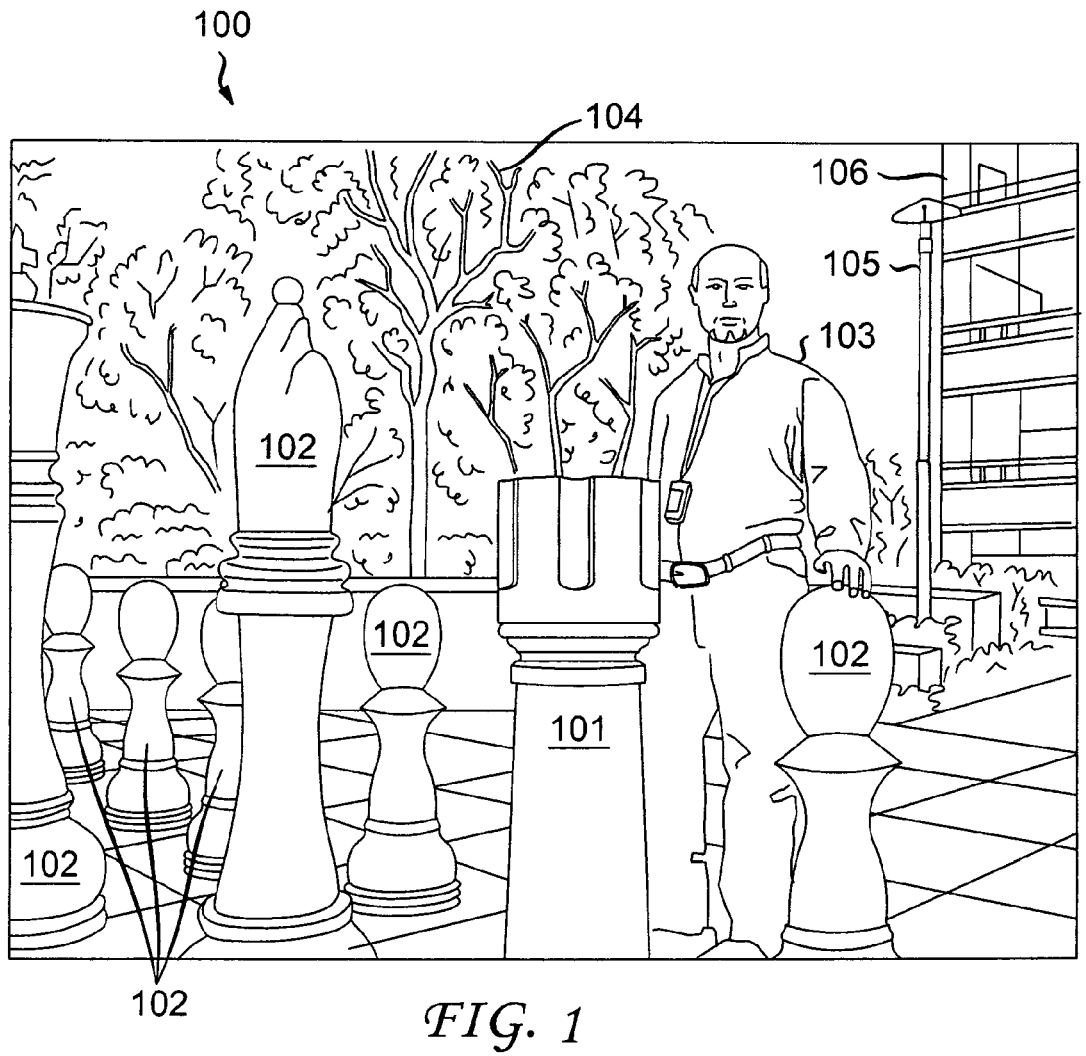
FIG. 1 shows an example of a scene in a presentation.

Embodiments of the present invention provide a method and system for preparing a subtitle or caption for display in a stereoscopic presentation, including adjusting at least one parameter associated with the subtitle such that the adjusted subtitle can be presented within a given display area without being obstructed or truncated by components or configuration of the display system. The adjustable parameters can include the subtitle's position in the plane of the display, dimensions or size, and horizontal disparity or apparent depth with respect to the plane of the display. By adjusting the subtitle's horizontal disparity based on the disparities of other objects in the content underlying the subtitle (i.e., occupying the same displayed image area), the subtitle and the objects can be displayed without conflicting depth cues to a viewer.

The present principles can be used in digital cinema theatre equipment and video equipment, such as head-end broadcast or streaming system as well as consumer-side equipment, including television monitors, set-top boxes, DVD players, video recorders, personal computers, hand-held displays such as those on video players or smart phones, and other mobile or portable devices. They are applicable to closed captions or subtitles that are not already burned-in to the main picture or image content, whether or not placement information is provided as metadata, and are used for displaying these subtitles or captions together with the image or content forming a part of a presentation.

In the following discussion, the terms 'subtitle' and 'caption' are used interchangeably, to refer to text or graphics that are not burned-in to the main image as distributed. Furthermore, subtitles and captions can include graphic overlay elements, whether produced by a terminal end device or supplied as part of the content stream. Examples of graphic overlay elements supplied by terminal end devices include the menus for a set-top box (e.g. cable or satellite box), on-screen displays from a DVD player or television controls including indicators for playback speed, volume setting, or the current channel. Some examples of graphic overlay elements supplied as part of the content stream can be a sports score, a news crawl, embedded advertisements, "coming up next" notices, broadcast network icons, and the like. Similarly, the placement and disparity of picture-in-picture display elements can be treated in the same manner as described herein, and thus, are understood to be included by references to subtitles or captions.

According to present principles, subtitles or captions (including subtitles, graphic overlays, picture-in-picture elements, and the like) for a 3D presentation, whether in digital cinema or video, are positioned or relocated in real-time, with size adjustments as needed, to accommodate masking or image resizing, and avoid encroachment on dimensional elements of the content, i.e., objects in the stereoscopic images. Alternatively, adjustments to the subtitles or captions can be done prior to actual content presentation, and the adjusted subtitles stored for use at some future presentation.

Thus, for a given image display area or system configuration (e.g., as defined by masking, image resizing or system-related arrangements), the present method allows the caption to be automatically adjusted in position, scale, and/or stereoscopic disparity (or combination thereof) so as to provide a caption and content display with improved aesthetics and legibility.

There are many possible sources of intrusions or system configurations that can interfere with a proper subtitle display. For example, in a theatre, a projector may overshoot the bounds of the screen as a result of curvature of the screen, angle of projection, non-ideal lens size or adjustment, so that the image space is effectively reduced. Screen masking or curtains may intrude on the usable area of the projection screen, or may trim a keystoned image into a more aesthetic rectangle.

In another example, a home monitor, such as a big screen television set, may over-scan an image (to display a subset of the image on the full screen), for example to avoid displaying the edges of the content or present high-resolution content without rescaling. In some modes, an individual monitor might expand a picture having an aspect ratio different than the monitor itself, for instance if a HD (high definition) monitor with an aspect ratio of 16:9 receives a SD (standard definition) program with an aspect ratio of 4:3, with the result that a certain portion of the image gets cropped off. Such interference or obstructions to proper subtitle display can be avoided by adjusting subtitles according to embodiments of the present invention.

Some background relating to the placement of 2D and 3D subtitles or captions are helpful towards understanding various aspects of the present principles. There are different ways of specifying placement of 2D captions. In one example, a bounding box (e.g., a minimum-size rectangle, oriented according to the axes of the display, for encompassing an object or item of interest) can be specified, as defined by the caption's overall height and width, and a location, e.g., the top-left corner for the bounding box. If the bounding box is not specified, the text of the caption may be rendered and a bounding box determined. If the location is not specified, it can default to a predetermined value (e.g., 10% off the bottom of the screen and centered left-to-right). Such placement conventions are well known and published in standards such as SMPTE 429-5-2009 D-Cinema Packaging—Timed Text Track File and related documents published by the Society of Motion Picture and Television Engineers, White Plains, N.Y.; MPEG-4 Part 17 text based subtitle format for MPEG-4, published as ISO/IEC 14496-17 in 2006; and the Synchronized Multimedia Integration Language (SMIL) produced by the international community of the World Wide Web Consortium (W3C), with offices in Cambridge, Mass., for which timed-text has been offered as of version 2.0; or in the file formats Substation Alpha (.SAS files), used by an obsolete product of the same name, created by CL Low; and Advanced Substation Alpha format (.ASS files, derived from the .SAS format) as used by the Aegisub subtitle editor (among others) promoted by a development community at the Aegisub website (www.aegisub.org).

Instead of the bounding box, a more precise description is the "minimum footprint" of a 2D caption, which is the region consisting of the set of all pixels of the rasterized caption (in the rasterized caption space, not in display space) having a non-zero contribution to the image when displayed completely (i.e., neither completely transparent nor masked or otherwise off-screen).

For the purpose of this invention, the "footprint" of a 2D caption may be provided either as a bounding box (i.e., a rectangle completely enclosing all pixels of the caption), the minimum footprint region described above, or other geometric figure substantially including the minimum footprint region.

The placement of 3D captions is similar to that of 2D captions, except for an additional parameter corresponding to a horizontal offset or horizontal disparity or distance between the right- and left-eye presentations of the captions (e.g., can be expressed as number of pixels, percent of screen width, or distance units, etc.). This may be provided as a single value representing an offset of the right-eye caption from a placement location or reference position used for the corresponding 2D caption, with the left-eye caption taking an offset of the opposite sign (i.e., being positioned from the 2D placement location in a direction opposite to that of the right-eye caption). Alternatively, the single value may represent a distance between the right-eye caption and the left-eye caption, with the left-eye caption being placed according to the 2D caption placement information. In this discussion, the latter representation is used, although both representations are equally valid and can be converted from one to the other using simple arithmetic to adjust the horizontal placement value.

To set the context of the later figures, FIG. 1 shows a representative scene from a presentation, e.g., a scene in a garden in which subsequent shots discussed below are made. Garden scene 100 shows an actor 103 standing amidst a set of garden size chess pieces 102, including one particular chess piece, a rook 101, in the foreground. Behind actor 103 is a tree 104. About the same distance back, but off to right side is lamp 105, and further still is building 106. The shots of garden scene 100 shown in FIGS. 2-15 are taken from positions slightly to the right of the vantage point represented in FIG. 1.

Figure 2:
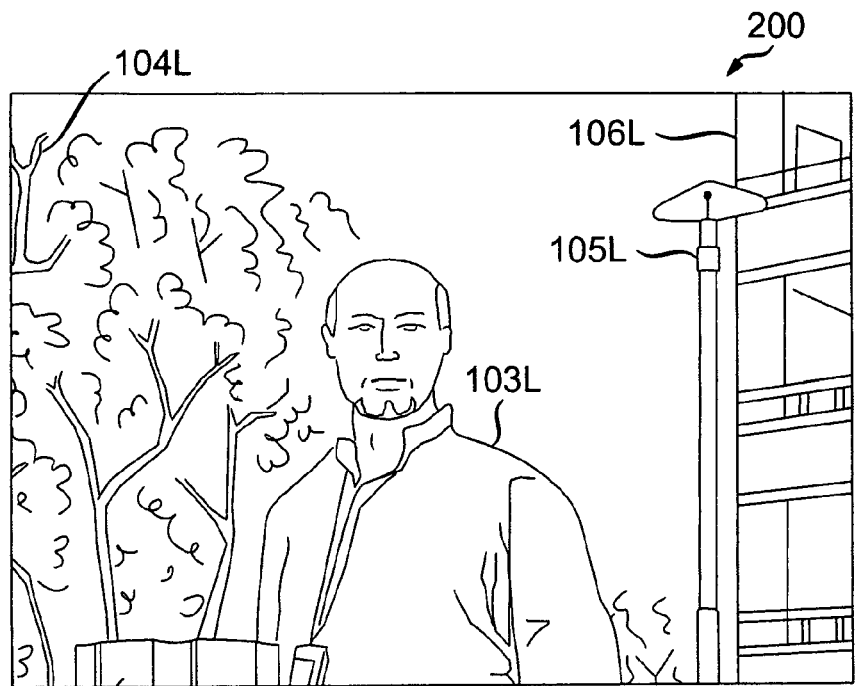
FIG. 2 shows a left-eye view of a 3D shot or composition in the scene of FIG. 1.
Figure 3:
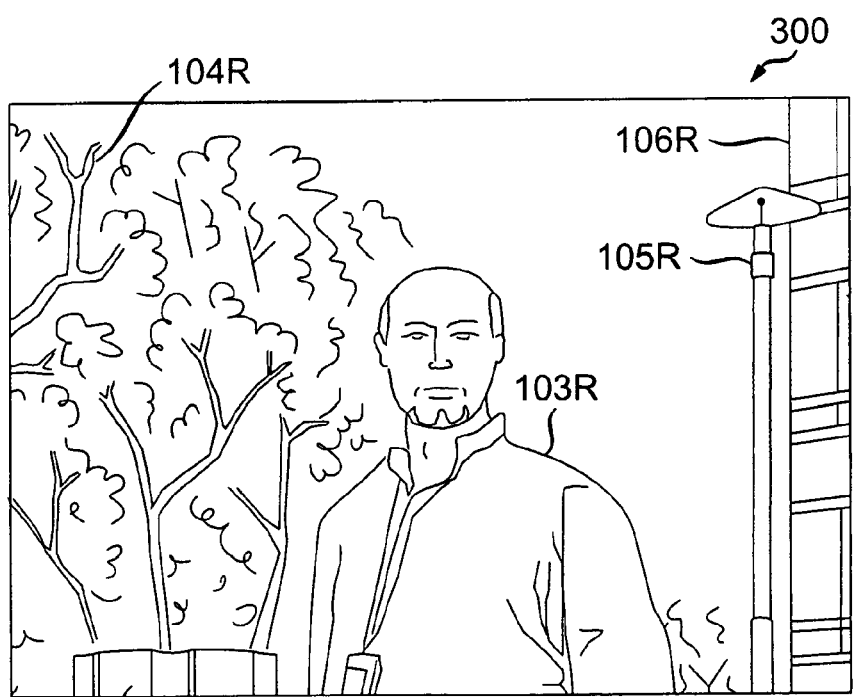
FIG. 3 shows a right-eye view of a 3D shot or composition in the scene of FIG. 1.

FIGS. 2 and 3 represent a stereoscopic image pair of a shot or composition from garden scene 100, with FIG. 2 showing a left-eye image 200, and FIG. 3 showing a right-eye image 300. Each image 200 or 300 includes recorded images of individual objects from garden scene 100 so that each object in the garden scene has a corresponding recorded image in the right- and left-eye images 200 and 300. To avoid potential confusion between images of objects from the scene 100 and stereoscopic images 200 and 300, the stereoscopic images may also be referred to as left- and right-eye compositions 200 and 300. Thus, actor 103 has corresponding images 103L and 103R, rook 101 has corresponding images 101L and 101R, tree 104 has corresponding images 104L and 104R, lamp 105 has corresponding images 105L and 105R, and building 106 has corresponding images 106L and 106R.

Figure 4:
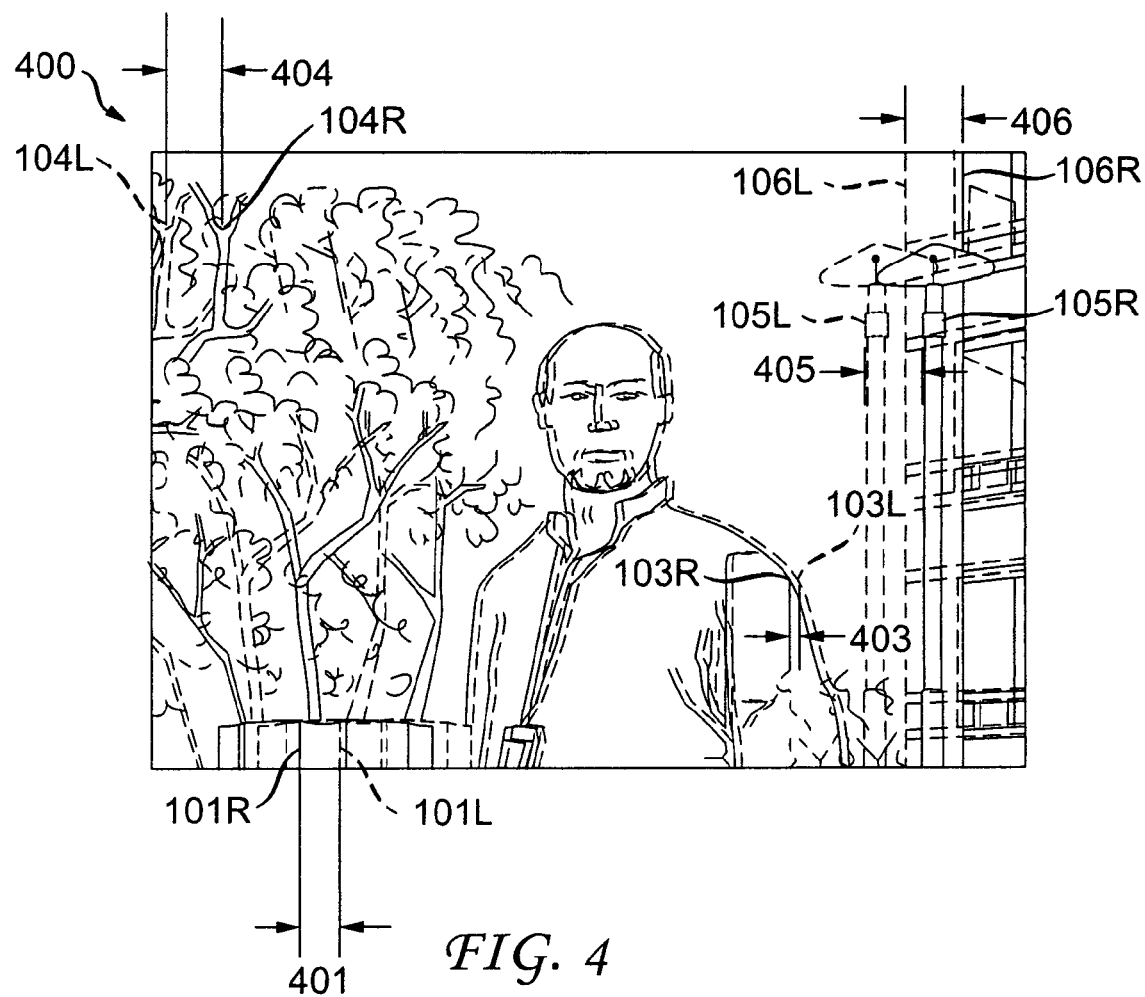
FIG. 4 shows a stereoscopic view formed by superimposed left- and right-eye images of FIGS. 2-3.

FIG. 4 is a stereoscopic view formed by a superposition of images 200 and 300, in which the left-eye image 200 is shown as dotted lines so that stereoscopic disparities or positional offsets between the right- and left-eye images (200, 300) are shown.

Several disparities are illustrated in FIG. 4. For example, rook disparity 401 associated with rook 101 (e.g., measured as a separation between corresponding vertical edges of right- and left-rook images 101R and 101L), is about −40 pixels horizontally with the measurement being positive when the right-eye image is to the right of the left-eye image. In the case of rook 101, since the right-eye image 101R is located to the left of the left-eye image 101L, the eyes of a viewer focusing on rook 101 would converge in front of a display (or screen or monitor) showing this stereoscopic pair, i.e., rook 101 would appear to be in front of the display.

The actor disparity 403 is about −5 pixels, as measured at his sleeve, which is slightly in front of the plane of the screen. Tree images 104L and 104R exhibit a disparity 404 of about +40 pixels, with the right-eye image 104R being to the right of left-eye image 104L. Thus, the tree 104 will appear to a viewer to be behind the display or screen. Lamp 105 appears with disparity 405 of about +45 pixels between images 105L and 105R, and building 106 appears with disparity 406 of about +60 pixels between 106L and 106R, each appearing still farther away than the tree 104.

Figure 5:
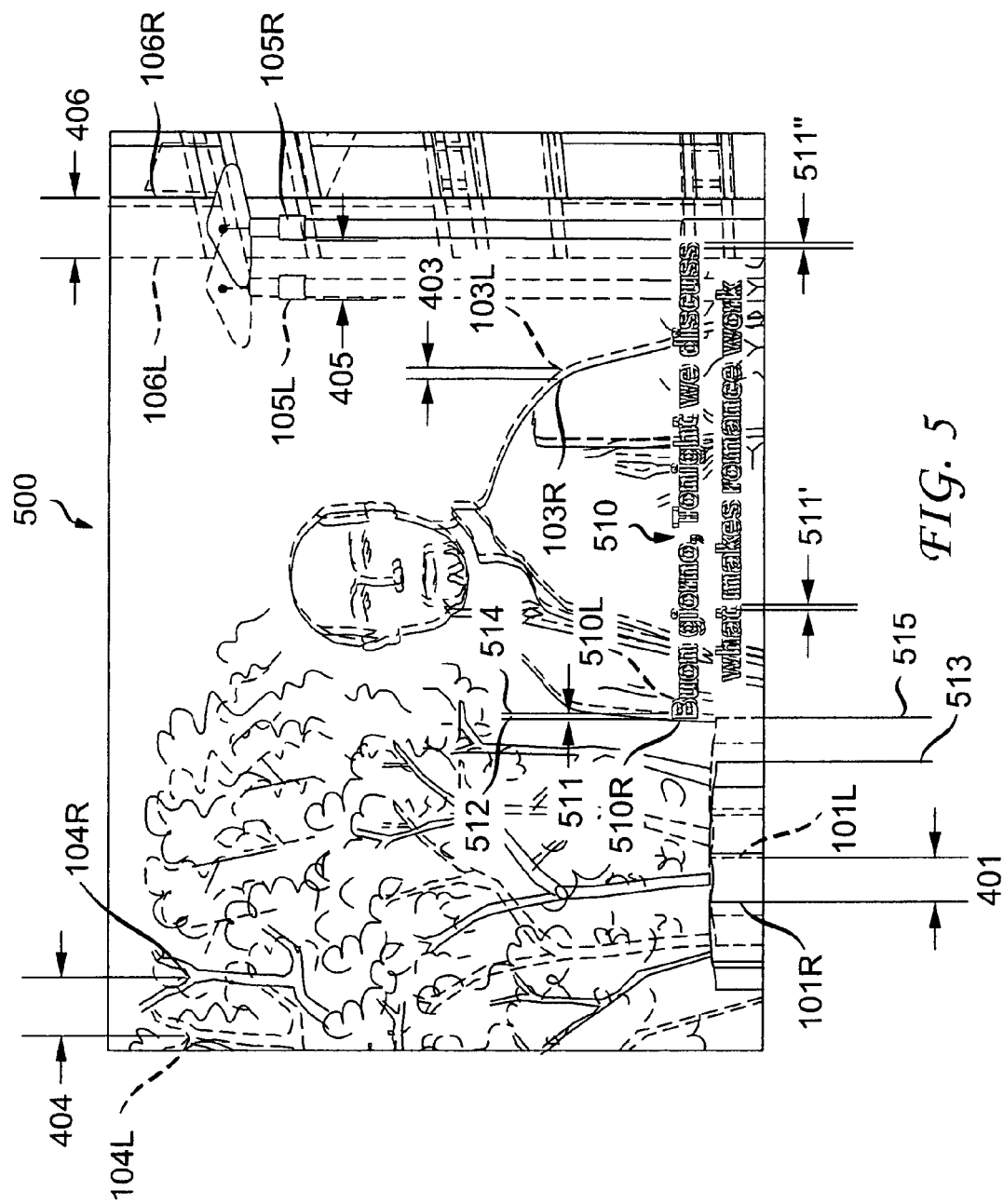
FIG. 5 shows a stereoscopic image with caption, illustrating disparities of the caption and various objects.

FIG. 5 shows a desired placement of stereoscopic caption 510 with respect to the stereoscopic view of FIG. 4. Stereoscopic caption 510 includes a right-eye image 510R and a left-eye image 510L, having a caption disparity 511 at the left edge of the caption of about −7 pixels (disparities 511' and 511" measured for other parts of the caption are also equal to each other). The footprint of this caption (whether bounding box or the tighter non-empty regions) has a leftmost edge at horizontal location 512 for the right-eye caption image 510R and 514 for the left-eye caption image 510L.

For a caption to appear flat, which is by far the most common intent, the caption disparity should be consistent or constant across the width of the caption, e.g., disparity 511 at the 'B', 511' at the lower 't', and 511" at the 'ss'. A caption can appear with perspective or curvature in the depth direction by varying the caption disparity, but this is rare.

As shown in FIG. 5, the left-most edge 514 of the left-eye caption image 510L is located to the right of the rightmost edge 515 of the left-eye rook image 101L. Thus, the rook 101 does not overlap or intersect the caption. As used in the discussion of the present principles, the overlap or overlay of a caption (or its footprint) with an image refers to an overlap in the image space (e.g., in x-y coordinate space), not necessarily overlapping in the depth direction. The gap is even more pronounced between rightmost edge 513 of right-eye rook image 101R and leftmost edge 512 of left-eye caption 510L. It is a matter of aesthetic preference to avoid displaying a caption over an object that has a smaller disparity than the caption (an object with a smaller disparity would appear closer to the viewer than another object with a larger disparity). In other words, it is preferable not to have a caption that is further away (with larger disparity) overlapping an object that is closer to the viewer. The reason for avoiding such overlays is that for the viewer, there will be a discrepancy in the stereoscopic information that disrupts the viewer's perception of the 3D effect. In the short term, this results in confusion and over a longer period produces fatigue.

Figure 6:
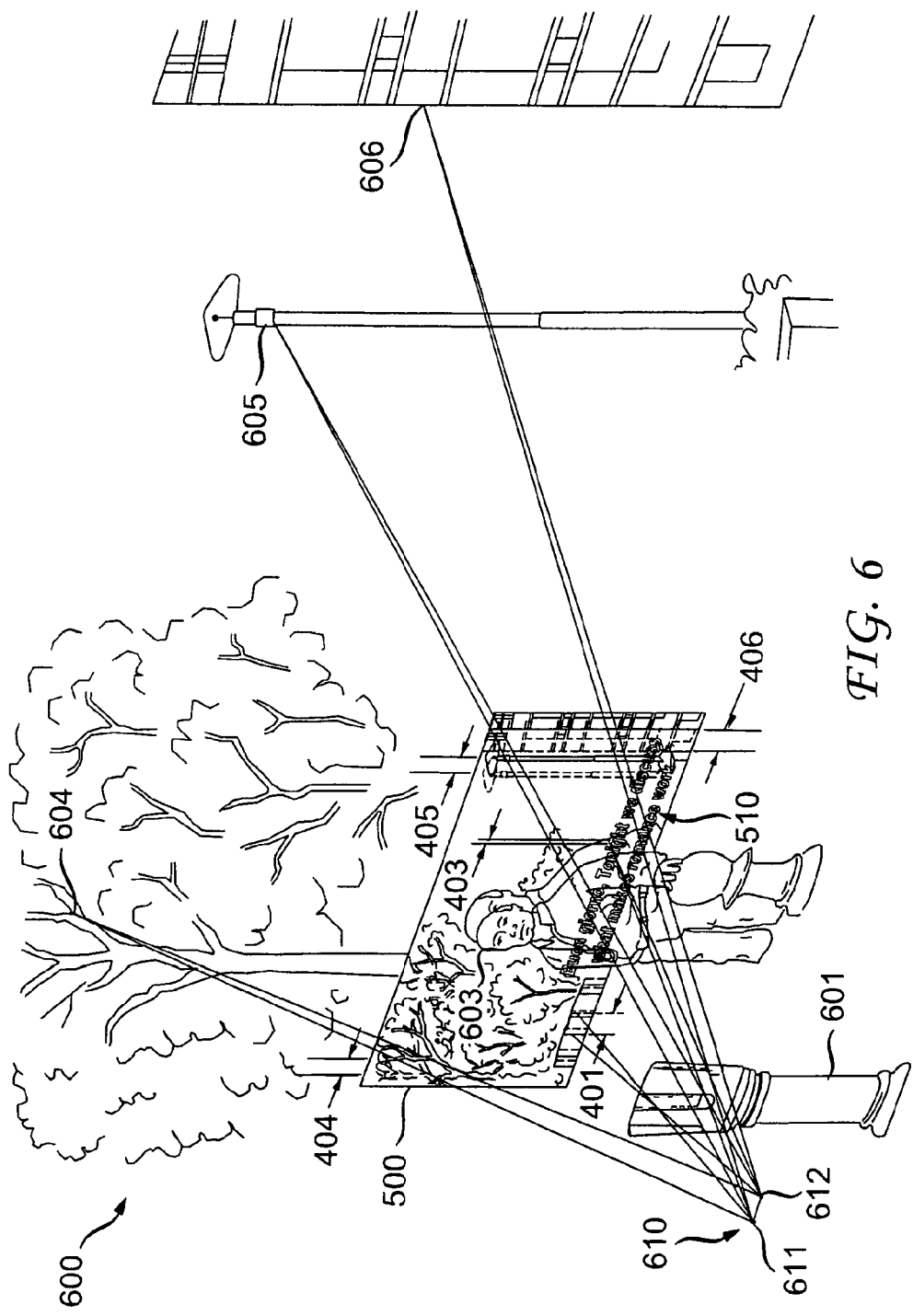
FIG. 6 shows an imaginary view of 3D perceived from stereoscopic image.

FIG. 6 is an imaginary view of the 3D image or scene perceived by viewer 610 having left-eye 611 and right-eye 612 viewing stereoscopic image 500 with caption 510. (FIG. 6 is referred to as imaginary because this view cannot actually be observed from this vantage point.) For viewer 610, the stereoscopic rook disparity 401 results in a perception of rook image 601 in front of the screen showing stereoscopic image 500. Actor image 603 (with offset or disparity 403) is slightly in front of the screen, with caption 510 just in front of the actor's image. Tree disparity 404, lamp disparity 405, and building disparity 406 each produces the perception of the corresponding images 604, 605, and 606 being at increasing distances behind the screen.

Although the images corresponding to different objects are shown as planar in FIG. 6, in practice, viewer 610 would perceive the object images 601, 603, 604, 605 and 606 as 3D, at various distances corresponding to the respective disparities. FIG. 6 shows the perceived 3D locations for objects with respective disparities 401, 403, 404, 405 and 406 (see also FIG. 4). Each object's perceived location is indicated by an intersection of respective rays traced from left-eye 611 and right-eye 612 through the reference point (at which disparity is measured for a given object).

Different scenarios and approaches for preparing subtitles or caption placement for stereoscopic presentations according to embodiments of the present invention are discussed by reference to FIGS. 7-15.

EXAMPLE 1

Figure 7A:
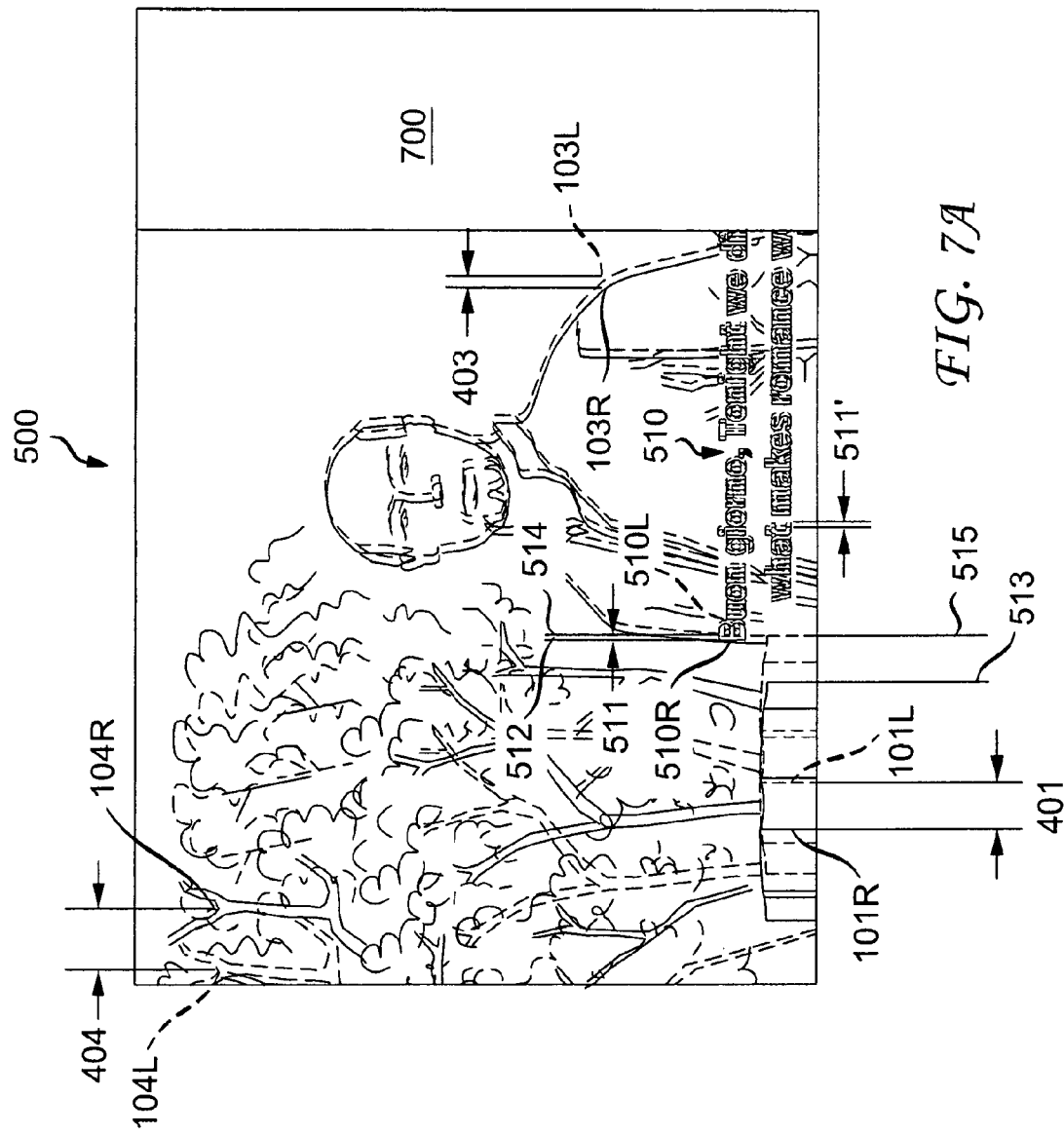
FIG. 7A shows a stereoscopic view with a caption being cropped.

FIG. 7A shows a situation where the screen showing stereoscopic image pair 500 (i.e., stereoscopic view with superimposed left- and right-eye images) with caption 510 is cropped or masked or otherwise obscured in region 700. One example that may result in such an obscured region 700 is theatrical masking (e.g., masking 1020 discussed in conjunction with FIG. 10A). In the presentation of FIG. 7A, a substantial portion of caption 510 is hidden from view by obscured region 700, which can detract from viewer's experience or enjoyment of the show.

FIG. 7B shows a first embodiment of subtitle display (may also be referred to as subtitle correction or adjustment) in which stereoscopic caption 510 in FIG. 7A is replaced with stereoscopic caption 710, which includes right- and left-eye caption images 710R and 710L, each of which is a scaled-down version of right- and left-eye caption images 510R and 510L. The scale factor for image 710R and 710L are equal, and selected to ensure that the resulting caption images are not obscured by region 700. For this embodiment, the caption disparity 711 is set to be the same as caption disparity 511, so that the stereoscopic caption 710 retains the same depth as caption 510. Furthermore, the leftmost edge 715 of the footprint of stereoscopic caption 710 (e.g., corresponding to the left edge of the alphabet "B") is the same as leftmost edge 515, thus ensuring that the bounding box footprint of stereoscopic caption 710 falls within the bounding box footprint of stereoscopic caption 510, and as a result will not interfere with the depth perception of any other object.

Figure 10A:
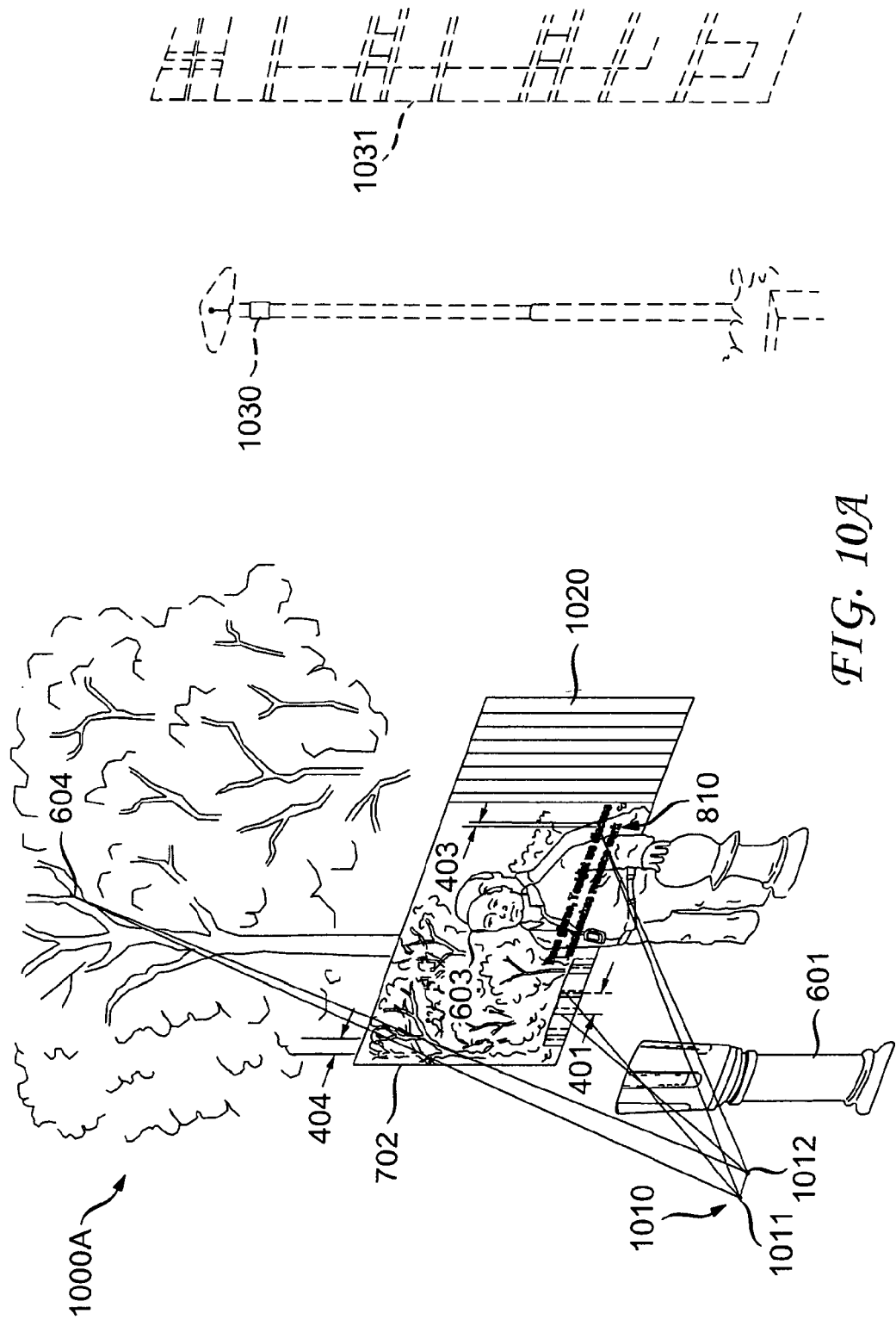
FIG. 10A shows an imaginary view of the image of FIG. 7B.

FIG. 10A shows an imaginary view 1000A of the subtitle produced by the scaling shown in FIG. 7B, in which scaled caption 710 appears in the same location where caption 510 is seen in FIG. 6, but by virtue of the reduced scale of caption 710, theatrical masking 1020 (or curtain) does not obscure the caption. Caption 710 retains the same disparity as caption 510, and so retains the same apparent distance from the screen.

One possible drawback to this approach of providing scaled stereoscopic caption 710 is that some combinations of the original footprint of caption 510 and obscured region 700 may require scale factors that make stereoscopic caption 710 unaesthetically small, or possibly result in no solution (i.e., if the original footprint of caption 510 were to lie wholly within obscured region 700). If no solution is found, or the scale factor for stereoscopic caption 710 is smaller than a predetermined value, a different correction or approach (several of which are discussed below) should be selected. In another embodiment, several corrections or corrective actions may be evaluated and the best scoring one selected for use, as discussed below.

EXAMPLE 2

In a second embodiment of subtitle display, if there is any overlap or intersection between the footprint of stereoscopic caption 510 and obscured area 700, the stereoscopic caption is translated or displaced, i.e., moved by a certain distance, to avoid truncation of the caption by the obscured area 700. However, a simple translation of stereoscopic caption 510 to the left may result in caption 510 overlaying or overlapping the stereoscopic image of rook 101 (i.e., when the caption and the rook image occupy the same x-y coordinates in the plane of the display, or the same area in 2D image space). Since the rook has a disparity 401 that is smaller than caption disparity 511 (i.e., rook disparity is more negative and therefore rook appears closer to the viewer 1010 than the caption does), this produces a depth cue conflict or paradox where the caption 510 appears to overlay the rook 101, and yet, has a disparity indicating it is behind the rook. In this situation, the disparity of the caption can be further adjusted to be smaller (e.g., closer to the viewer, which may be a disparity that is larger in magnitude, but with a negative sign) than the disparity of the nearest object overlaid, in this case, rook 101 with disparity 401.

Thus, in FIG. 8, stereoscopic presentation 800 includes stereoscopic caption 810 comprised of right-eye caption 810R and left-eye caption 810L (shown as dotted lines), both of which have been translated horizontally leftward relative to the footprint of caption 510, by an amount sufficient to stay clear of obscured region 700. Caption disparity 811 is selected to be smaller than or equal to rook disparity 401, thus causing caption 810 to appear in front of or at the same apparent depth as rook 101.

Figure 10B:
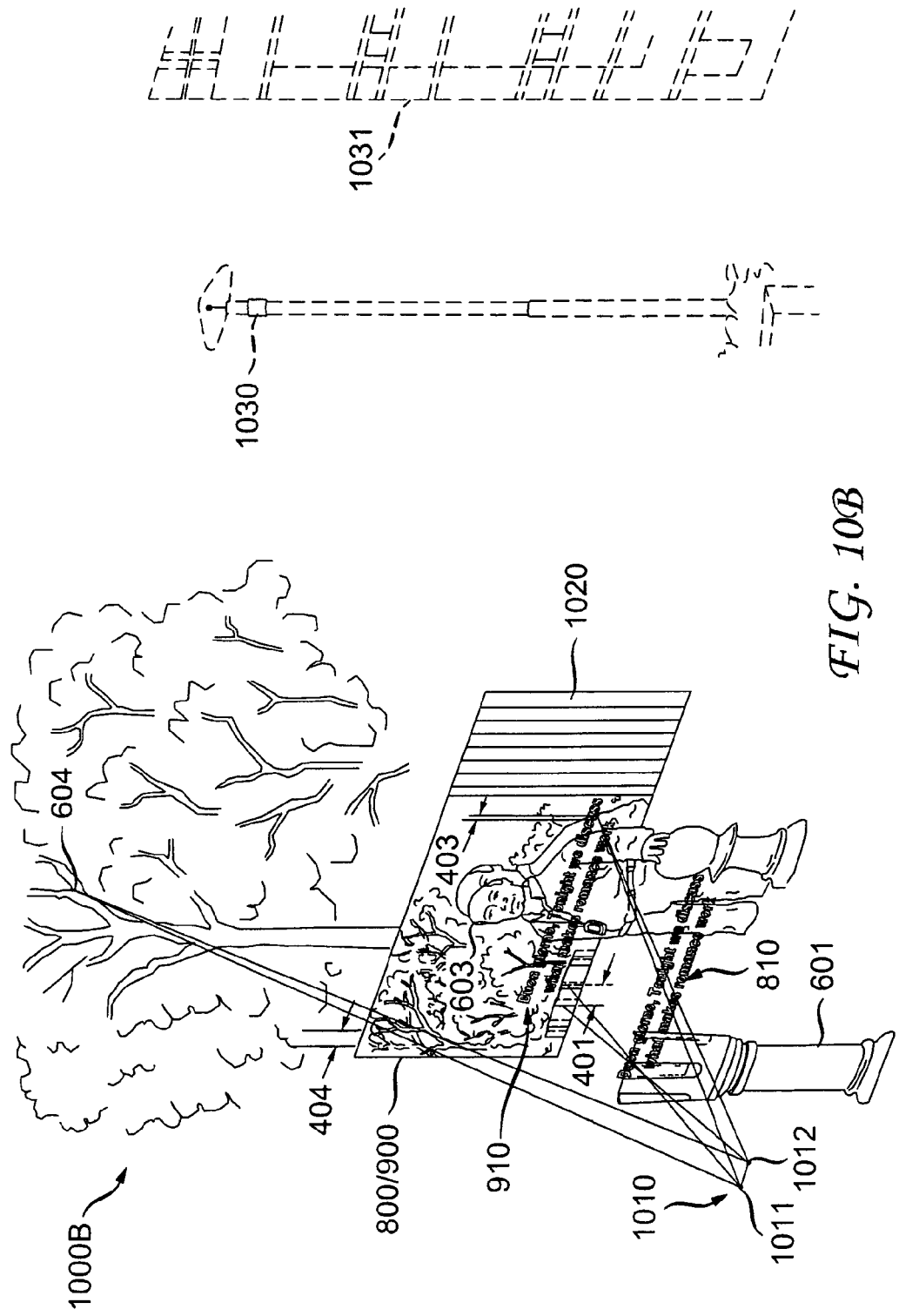
FIG. 10B shows an imaginary view showing both displays in FIGS. 8 and 9.

FIG. 10B shows an imaginary view 1000B corresponding to FIG. 8, with the caption 810 having a modified position and disparity. By comparing FIG. 10B with FIG. 6, one can see the change in caption placement and apparent depth of caption 810 relative to the original placement and apparent depth of caption 510.

One option for the translation of caption 810 relative to that of caption 510 is to determine at what fraction of the screen width the vertical centerline of caption 510 appeared (which in FIG. 5 is about 60% from the left edge of presentation 500), and re-apply that percentage within the clear portion of the presentation, i.e., recalculate the percentage as being that of the clear area, as shown. Another option (not shown) is to select the minimum distance necessary for the translated caption to clear the obscured region by a predetermined amount. This selection would have resulted in the rightmost edge (at the 'ss') of the left-eye image 810L (the dotted caption image) to just clear obscured region 700 by the predetermined amount, i.e., a minimum relief value or a threshold.

In some instances, the selected translation or displacement value may result in the caption crossing the opposite edge of the presentation or displayed image/content, so that the portion of the caption translated beyond the opposite edge of the clear area becomes obscured instead. As taught by Redmann WO 2010/096030, this caption displacement produces an 'opposite edges violation', which requires that the caption be scaled down to avoid crossing either edge since mere translation cannot avoid truncation or cropping of the subtitle. In such a case, the determination of a scale factor to be applied to the caption should also consider how changes in disparity may increase or decrease the footprint. In this case, a scale factor that maximizes the width of the caption while maintaining a predetermined minimum relief value 'r' is given by Equation 1:

$$s = \frac{(W_A - |D_N| - 2r)}{(W_O + |D_O|)} \quad \text{EQ. 1}$$

where 's' is the scale factor, $W_A$ is the available width of the unobscured region, $D_N$ is the new disparity (in this case, caption disparity 811), $W_O$ is the original width (i.e., the width of the caption for either eye, i.e., caption image 510R or 510L), and $D_O$ is the original disparity (in this case, caption disparity 511).

If 's' is greater than or equal to one, scaling is not needed, and the available width is adequate. But if 's' is less than one, then each of the right- and left-eye images of the caption must be reduced by the factor s, which will result in a stereoscopic caption that is inset in the available width by just the minimum relief value on either side. The width $W_N$ of the scaled-down (or adjusted) caption is given by Equation 2:

$$W_N = s \times W_O \quad \text{EQ. 2}$$

An aesthetic utility function for a correction of this type can be established to include the value of scale factor 's' (which, if no scaling is needed, is set to one), and the magnitude of the change in disparity $|D_O - D_N|$ or the signed change in disparity, $(D_O - D_N)$. For the purpose of this discussion, the aesthetic utility function is used for quantifying or rationalizing a choice of the aesthetic quality associated with a certain caption placement or adjustment. The function can take any form, which is usually constrained by certain edge conditions. In the context of this invention, the function or equation includes parameters such as scale 's' and change in disparity 'd'. The function can be based on empirical measurements, and in many cases, from an educated guess, or a combination of sources, to create a "measure of utility", e.g., a measure of the aesthetic deviation from the original caption placement (which, since it was created by a human with artistic responsibility, might be considered "perfect").

Given several possibilities in caption scaling and/or displacement, the utility function can provide a measure for the least objectionable or best available choice. Ideally, the same utility function might be used for all possible variations of caption repositioning, but this is not necessarily the case. However, if different measures are created for different caption manipulations, a mechanism is needed to determine which of two possible placements is preferred or equally acceptable. Large changes in disparity may result in a "harder to watch" presentation 810 that is less appealing to a viewer, since the caption 810 might be far in front of the image of the object of interest, in this case, actor 103. The original artistic intent of the caption placement in presentation 500 is to place the stereoscopic caption 510 just in front of and close to the stereoscopic image of actor 103, so that there is little change in the convergence of a viewer's eyes between reading caption 510 and actor 103.

EXAMPLE 3

In a third embodiment for subtitle display, correction to an otherwise truncated subtitle involves avoiding intersections or overlaps between the footprint of stereoscopic caption 510 and obscured area 700. This can be achieved by translating the stereoscopic caption to avoid not only the obscured area 700, but also to avoid regions containing objects with disparity smaller than that of the caption, i.e., objects appearing closer to the audience or in front of the caption. One approach is to track a clear area, initially an area corresponding to the image 500 less the obscured area 700, and then subtract from that clear area all regions having objects with disparities less than the disparity 511 of the caption. This may be achieved by creating or obtaining a disparity map for stereoscopic image 500 and comparing each location in the disparity map to disparity 511, thereby binarizing the disparity map.

For example, a location with a disparity equal to or larger than disparity 511 will be assigned a first value, and a location having a disparity smaller than disparity 511 will be assigned a second value. If, as a matter of policy, there is a minimum relief value 'r' by which captions should clear closer objects (e.g., rook 101), then the binarized disparity map may be dilated by 'r' to expand the closer object region (dilation is a common image processing function used with binary images, in which any false-valued pixel within range 'r' of a true-valued pixel becomes set to true. This would be like adding a halo of thickness 'r' around rook 101 and considering that the equivalent of obscured region 700 for the purpose of caption placement). Both the resulting binarized disparity map and obscured area 700 are removed from the clear area. In an alternative implementation, the region occupied by foreground rook 101 and obscured area 700 could be subtracted from the area corresponding to image 500 to obtain the clear area, which would then be eroded by minimum relief value 'r' to refine the clear area in accordance with policy (with erosion, any true-valued pixel within range r of a false-valued pixel is set to false).

Figure 9:
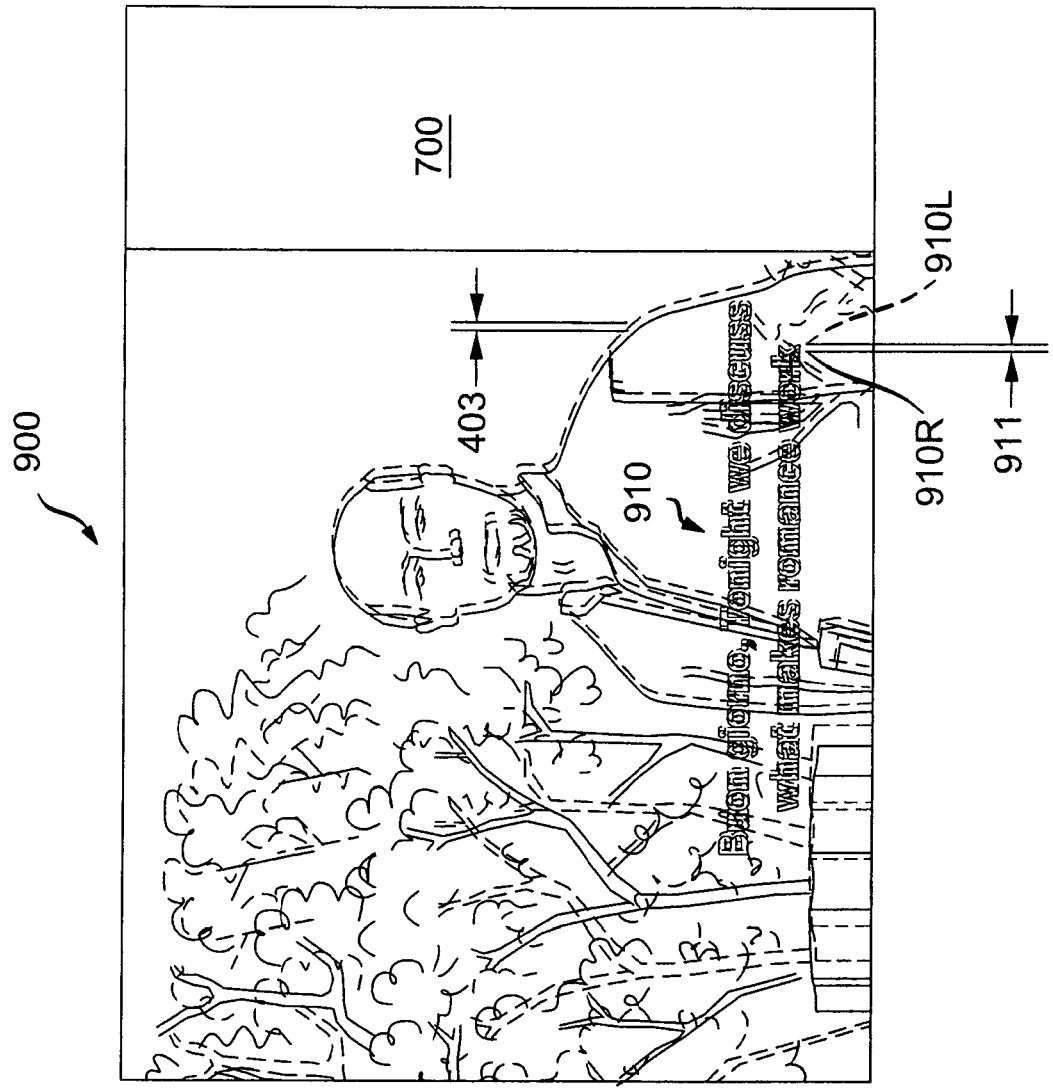
FIG. 9 shows a stereoscopic image with caption adjusted in position to avoid cropping and conflicting depth cues with respect to an object in 3D image.

The result of this correction is shown in FIG. 9, where caption 910 has been translated or displaced to avoid overlap with obscured region 700 and object rook 101 that is closer to the audience. The disparity 911 between the right- and left-eye images 910R and 910L of caption 910 is the same as original disparity 511. Thus, caption 910 avoids obscure region 700, and, by staying clear of rook 101, also avoids conflicting depth cues. Furthermore, it remains in the same apparent depth as originally selected, thereby retaining at least some of the original artistic intent.

Caption 910, with its modified position from FIG. 9, is shown in imaginary view 1000B in FIG. 10B (and also shows caption 810, described above). By comparing FIG. 10B with FIG. 6, one can see the change in caption placement and apparent depth of caption 910 relative to the original placement and apparent depth of caption 510.

To determine a minimum or near-minimum translation or displacement sufficient to place an at least partially obscured caption (e.g., 510) entirely within a clear or safe area (e.g., the area of stereoscopic image 900 minus both the obscured area 700 and the region containing rook 101), the following procedure can be used. For each pixel in the clear area, determine whether the footprint of the caption, if located at that pixel, would lie entirely within the clear area, i.e., with the footprint "located at that pixel", every pixel within the footprint lies within the clear area. When the footprint of the caption is referred to as being located at a pixel, it means that the pixel is used for defining the position of the footprint. One possible option is to use the pixel for defining the position of the top-left corner of the bounding box. Another option would be the position of the centroid of the caption (or of the bounding box, which might not be the same measure). For each pixel within the footprint that intersects a pixel outside the clear area (i.e., the footprint extending beyond or outside the clear area), calculate the maximum scale factor such that a scaled footprint having the same location would not intersect the pixel, and for the location note the smallest scale factor so computed. In an alternative embodiment, rather than examining every pixel within the clear area, the examination of locations may be done sparsely or only for some pixels. For example, a raster of every 10th pixel in every 10th row might be examined, or a Monte Carlo method can be used for evaluating random points within the clear area.

A utility function for use with this third caption relocation method can be based on the distance between the relocated or new caption location and the original caption location and the scale factor. A new location that is a few more pixels away from the original position, but requires no scaling, is likely to be a better choice than a slightly closer location that requires the caption to be shrunk by 10%. The utility function may consider vertical displacement to be more costly or less desirable than horizontal displacement. The evaluation of the utility function across the clear area (evaluated completely or sparsely, i.e., for each pixel or selected pixels in the clear area) will produce a gradient of which a minimum is a preferred choice for placement of relocated caption 910. As points are sampled and the gradient is incrementally developed, a more sophisticated search strategy can optimize the selection by using the developing gradient to focus on regions that score well, without getting stuck in a local minimum.

In a similar method, salient regions of the image (e.g., with important features) may be subtracted from the clear area. For example, it would be poor presentation to relocate caption 910 so as to cover the face of actor 103, since an actor's face frequently defines a salient region of an image. Similarly, if there are certain important details of action going on in the background, it would be a poor choice to relocate a subtitle to result in that action being hidden. For this reason, salient regions, for example those detected in the manner taught by Le Muer et al. in U.S. published patent application US 2009/0110269, may be subtracted from the clear area. In this way, a salient portion of the image is treated in the same manner as an obscured area (e.g., 700), or an object (e.g., rook 101) nearer than the caption. The subject matter in US 2009/0110269 is herein incorporated by reference in its entirety. In an alternative embodiment, values in a salience map (e.g., as taught by Le Muer et al.) overlaid by the footprint of a caption at a candidate location may be accumulated and applied to the utility function for that position. In this way, other things being equal, a caption position overlaying or intersecting a greater number of more salient pixels would receive an inferior utility value than a different caption position overlaying less salient and/or fewer pixels.

Note that when an intersection or overlap is being determined between pixels of an object or salient region and pixels of a caption at a location, a first comparison may be made between the left-eye image object and the left-eye caption image (e.g., rook 101L and caption 510L in FIG. 5), and a second comparison made between the right-eye image object (e.g., 101R) and right-eye caption image (e.g., rook 101R and caption 510R in FIG. 5). Alternatively, the comparison may be made between the footprint of the caption (comprising the union of the left-eye caption image and right-eye caption image) and the intersection of the clear areas for the right and left eyes. For example, one can compute a clear area for the right eye only, e.g., by eliminating all objects in the foreground (i.e., the resulting clear area will exclude the areas occupied by the objects). The same computation is then made for the left-eye by excluding areas occupied by objects for the left-eye image. The "intersection of clear areas" would be those pixels that are in the clear area of both the left- and right-eyes.

In still another embodiment, a comparison may be made for one eye only, i.e., comparing L- (or R-) eye image with the L- (or R-) eye caption, with the expectation that spatial coherence would not produce a substantially different decision. (Spatial coherence here refers to the notion that if the left-eye image shows a nice, smooth surface not impinging on the caption, it is unlikely that the other-eye image would exhibit a radically different contour, and if it does, this may be negligibly infrequent.) This choice would be particularly efficient if a correct choice of the minimum relief value can substantially ensure that interference with an apparently closer object would not occur. To gain this assurance, in most cases, it is sufficient to apply the minimum relief value (or minimum separation between an object and caption) to only one side-of the object that is also the same side as the corresponding eye's image under consideration (that is, when considering the left-eye image, the minimum relief value may be applied to only the left-side of the object image in question). Alternatively, this minimum relief can also be applied to the left side of a caption image. As a matter of policy or artistic intent, one can specify that a caption be no closer to an object than this minimum relief value. In one implementation, this can be expressed in disparity, e.g., ½ pixel or 1 pixel, so that even at its closest placement, the caption appears to be separated from the underlying object over which the caption has been placed. This separation in the apparent depth (or z-direction, as opposed to the x-y image plane) results from the caption disparity being set according to the minimum relief value.

Figure 11:
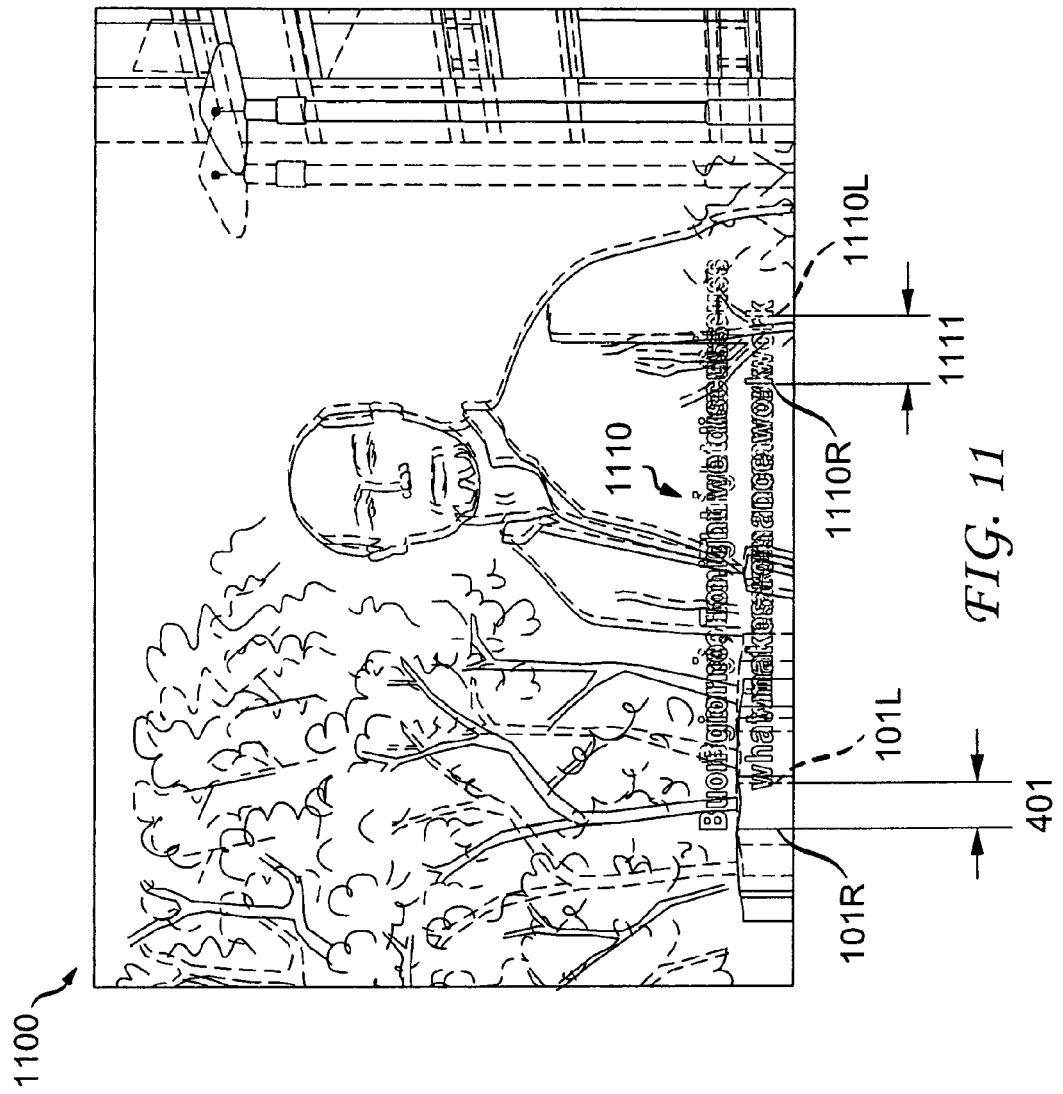
FIG. 11 illustrates another caption placement in a scene.
Figure 12:
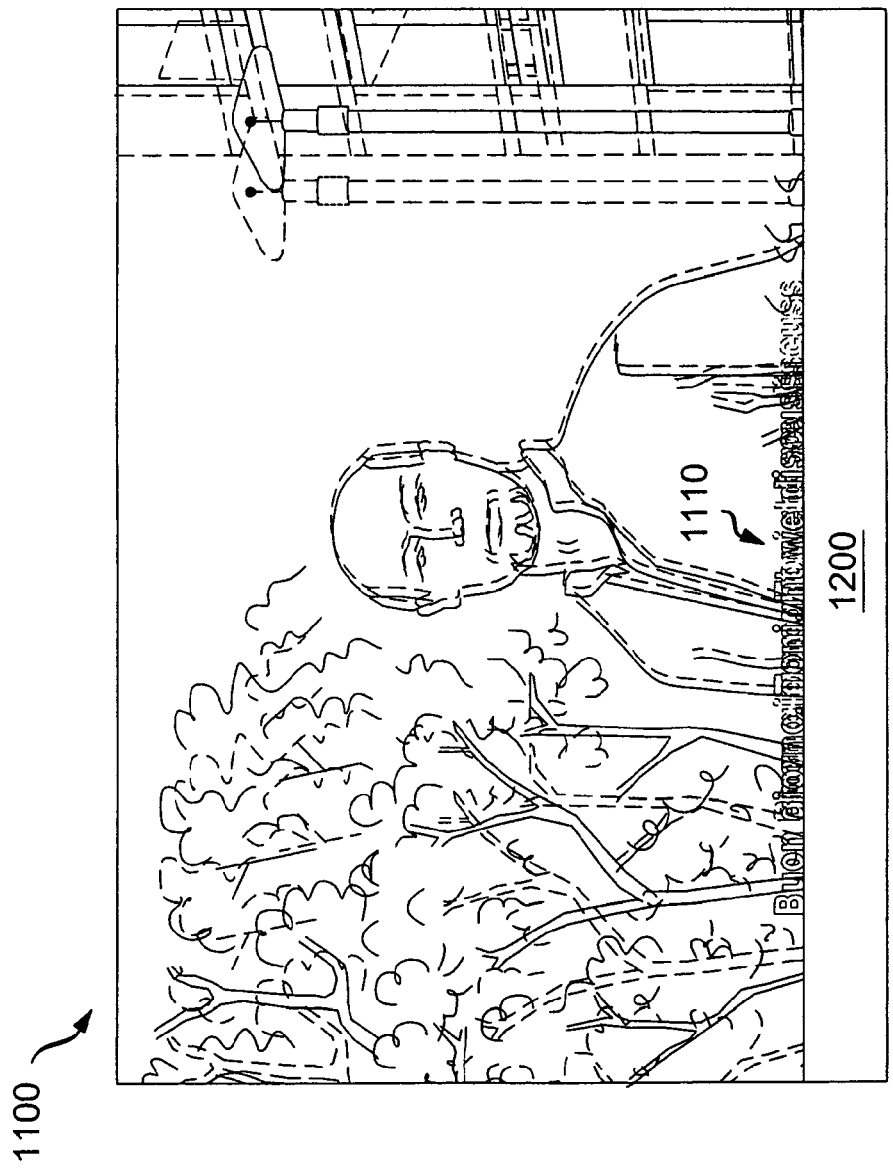
FIG. 12 shows the display in FIG. 11 with caption being cropped.
Figure 13:
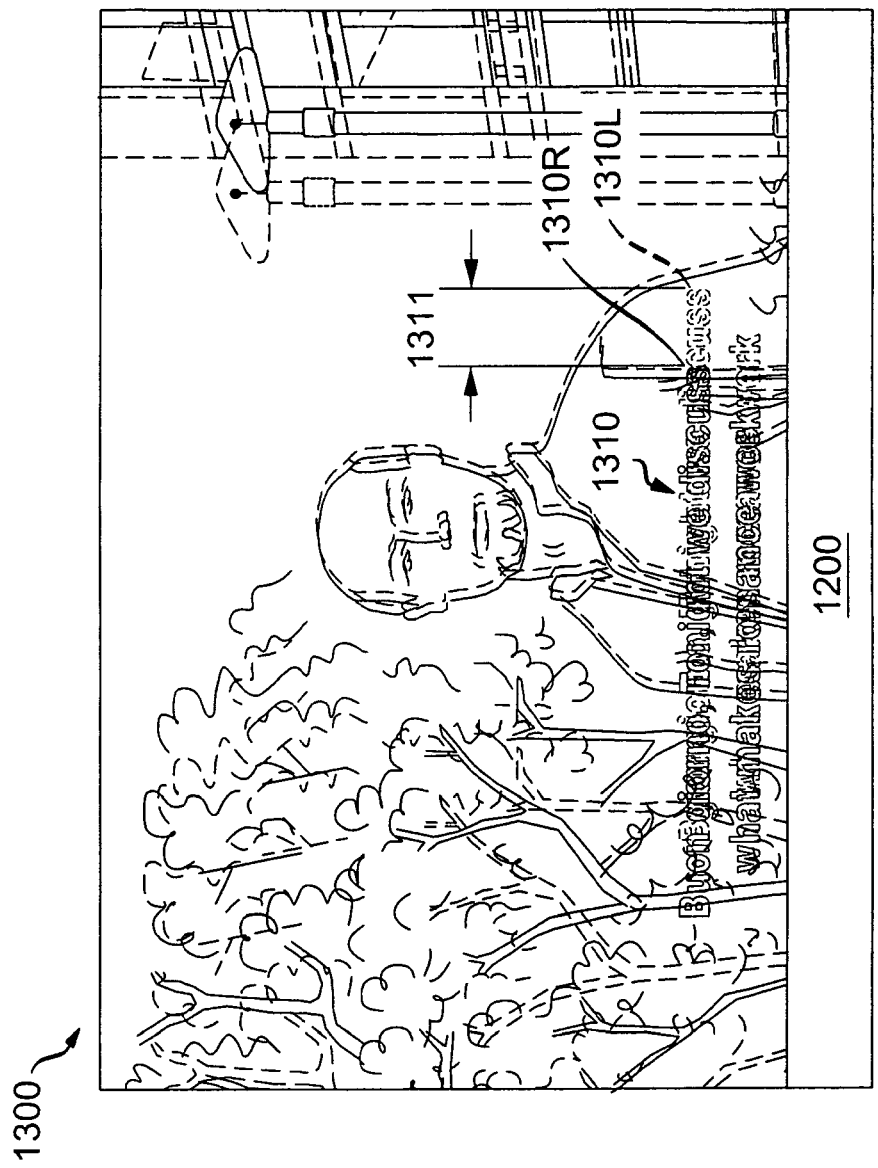
FIG. 13 shows the caption in FIG. 11 being translated upwards to avoid cropping.

This caption placement approach is further illustrated by FIGS. 11-13, in which FIG. 11 shows another presentation 1100, where caption 1110, with right- and left-eye caption images 1110R and 1110L, has a stereoscopic disparity 1111 larger than rook disparity 401. By locating caption 1110 in front of rook 101, apparent depth conflicts between the caption and rook can be avoided. Similar to caption 810 in FIG. 10B, caption 1110 is placed close to rook 101, and far in front of the screen.

FIG. 12 shows an example in which an obscured region 1200 cuts off a portion of caption 1110, thereby compromising presentation 1100. This is remedied in FIG. 13 by positioning caption 1110 to a location that will not cause any cropping or masking of the caption, and will avoid overlapping any object with smaller disparity than the caption and any salient regions (e.g., the face of actor 103). Thus, presentation 1300 shows caption 1310, comprising right- and left-eye caption images 1310R and 1310L, which is a relocated version of caption 1110, i.e., translated upwards to avoid obscured region 1200, but not far enough to overlap the actor's face. The original disparity 1111 of caption 1110 is maintained as disparity 1311 in FIG. 13 so that caption 1310 still appears far in front of the screen.

EXAMPLE 4

Figure 14:
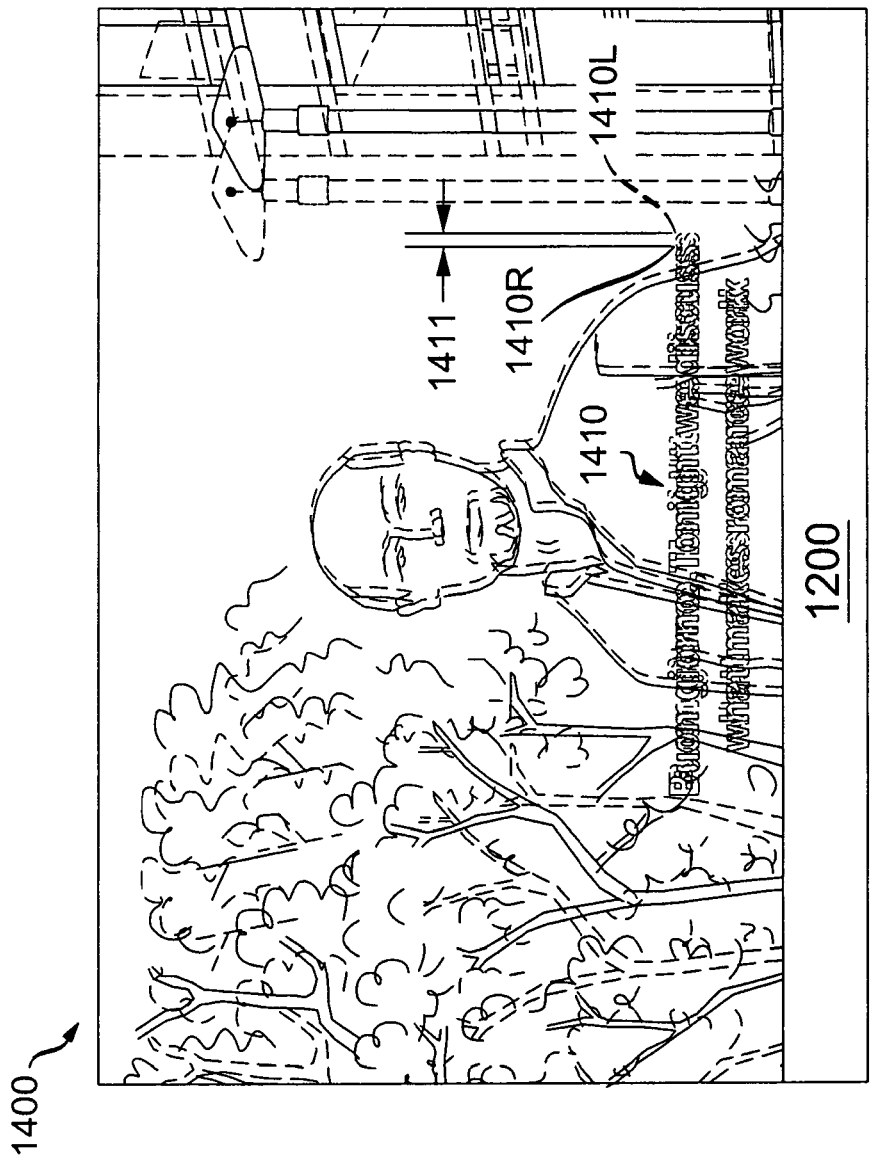
FIG. 14 shows the caption having an adjusted disparity to provide a certain relationship with respect to the disparity of an object in the 3D image or content.

FIG. 14 shows a presentation 1400 in which the disparity of caption 1310 is further adjusted from that of FIG. 13. Specifically, the presentation or image content beneath or overlapping the footprint of caption 1310 has been examined for minimum disparity (i.e., identifying an object overlapping the caption's footprint that is nearest to audience), and upon finding that nearest object, increasing the disparity of the caption (i.e., moving caption further from audience) up to the disparity of that nearest object. Thus, if a subtitle or caption was previously placed far forward to avoid depth cue conflict with an object that is no longer in view (e.g., caption 1310 placed in front of rook 101, which is now hidden by obscured region 1200), the subtitle may be moved as far back as the nearest object overlaid by the subtitle—but no further, since that would create a depth cue conflict. This prevents a caption from being "orphaned" far out in front of other objects, which would otherwise result in a difficult to watch presentation 1300. As a result, the caption 1410, comprising right- and left-eye caption images 1410R and 1410L, are set with stereoscopic disparity 1411, which is the same as or slightly less than the disparity 403 of the images of actor 103. Alternatively, the caption can be pushed back to be no closer than a predetermined "minimum relief value" with respect to the nearest object overlaid, as described above.

Figure 15:
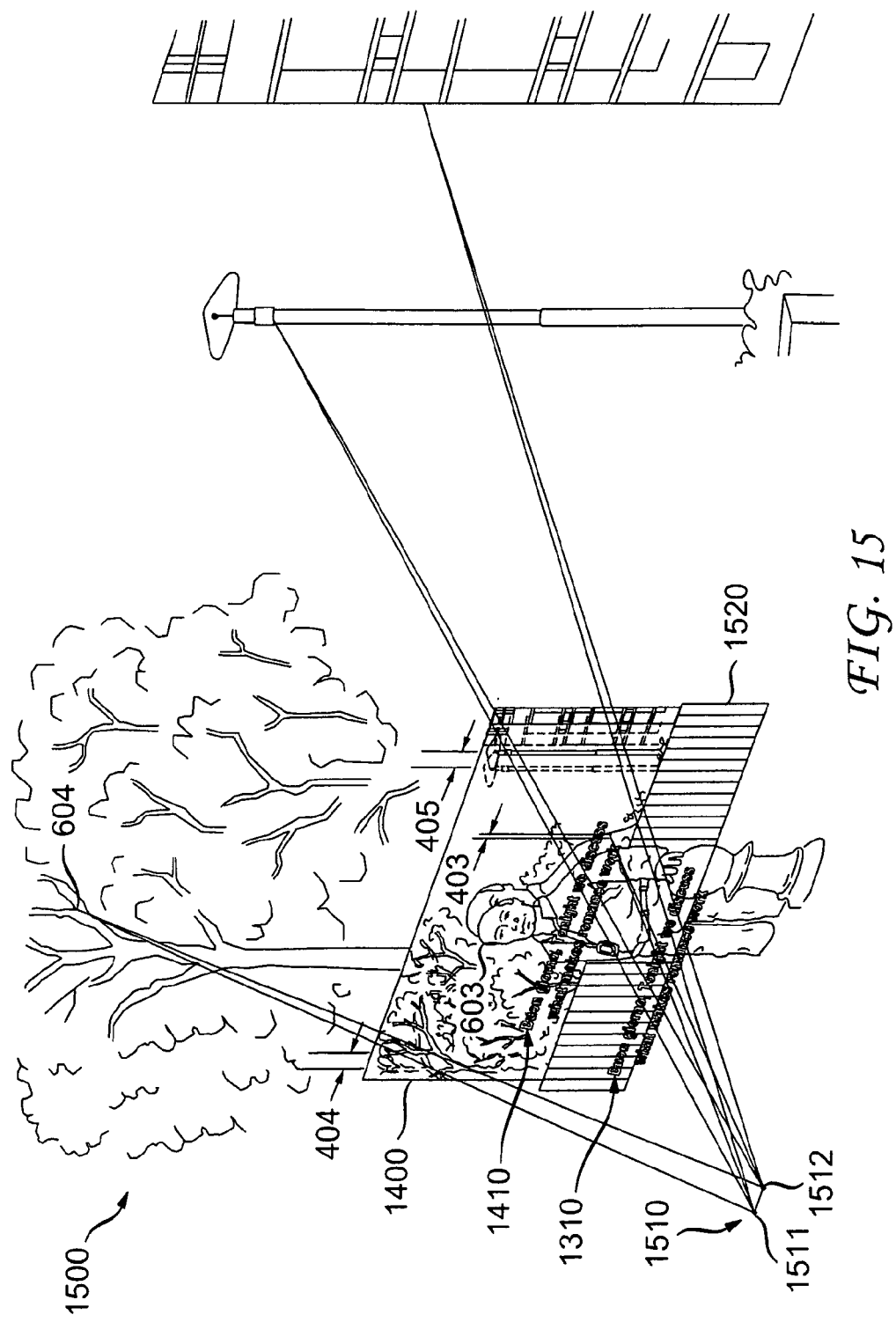
FIG. 15 shows an imaginary view showing both displays of FIGS. 13 and 14.

FIG. 15 shows a combined imaginary view of presentations 1300 and 1400 in which merely translating the caption 1110 upwards to avoid obscured region 1200 in FIG. 13 results in the caption 1310 appearing to float far out in front of the nearest object image, namely, actor image 603. (Recall that caption 1310 was originally located far in front in order to avoid depth cue conflict with a previous nearest object, rook image 101, which is now obscured by masking 1520.) Instead of leaving caption 1310 far in front, its disparity is increased (made more positive) to be similar to that of the next closest object, as explained above for FIG. 14, resulting in caption 1410 appearing closer in depth to the actor 603. However, the caption disparity should not exceed that of the next closest object, and in some embodiments, be no closer than the minimum relief value to the next object overlaid by the caption.

The examples illustrated above for adjusting captions can be summarized as follows:
1) scale caption in place, without changing caption disparity (when there is no depth cue conflict with any object);
2) translate caption, with optional scaling, to avoid obscured areas, but reduce disparity (move the caption closer to viewer) to avoid depth cue conflict with an object;
3) translate caption, with optional scaling, to avoid both obscured areas and depth cue conflicts; and
4) translate caption, with optional scaling, to avoid obscured areas, and increase disparity (move the caption farther from viewer) if too far forward from next closest object.

Figure 16:
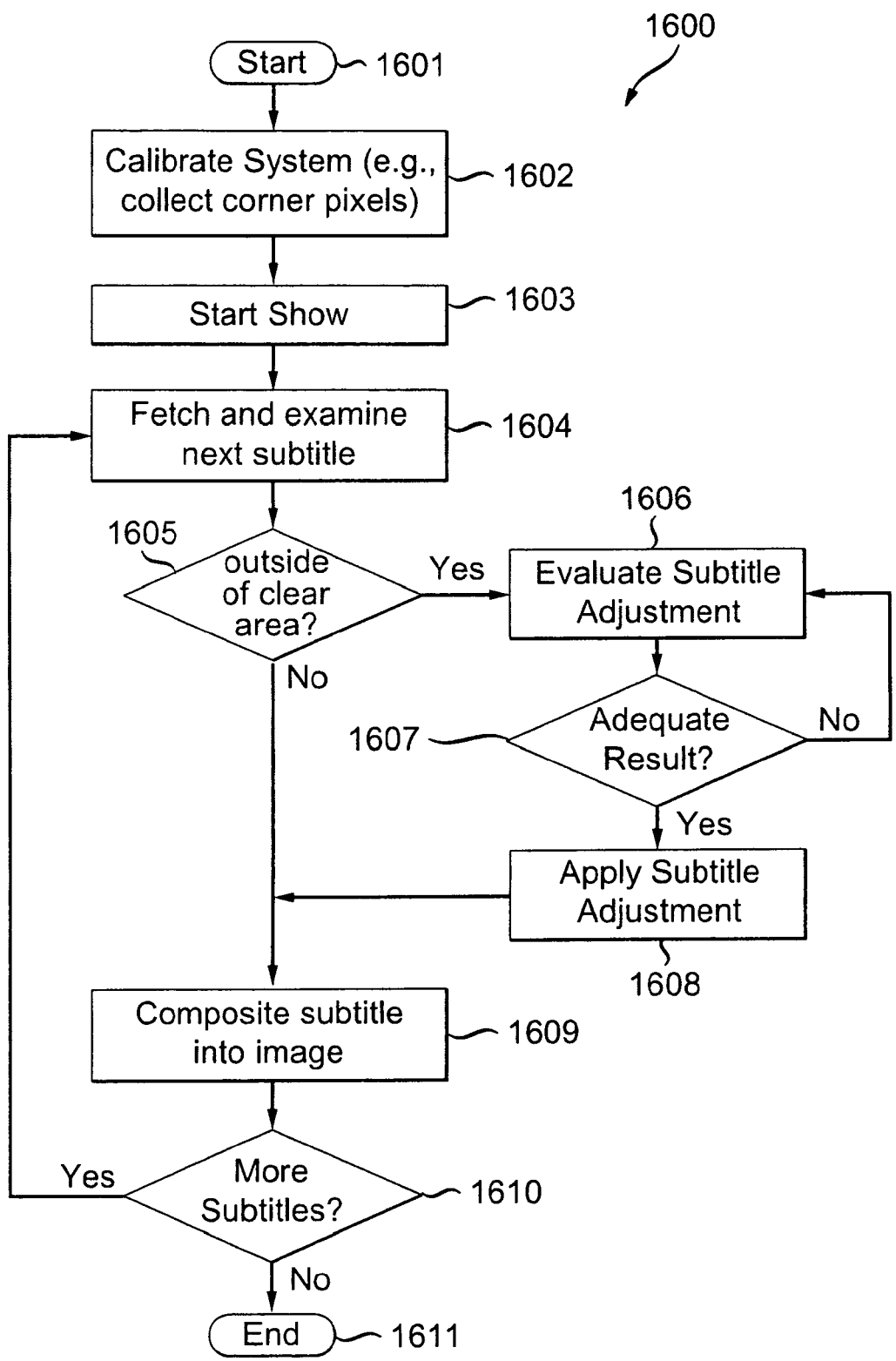
FIG. 16 shows a method for adjusting subtitles for display with 3D content presentation.

FIG. 16 illustrates a method for preparing captions for display in accordance with embodiments of the present principles. The process involves relocating or repositioning one or more captions so that each caption is displayed in its entirety without being cropped or obstructed, e.g., as may occur due to a reduced image area, as when portions of the image become obstructed or masked. Method 1600 begins at step 1601, in which a presentation system and associated settings (e.g., specific auditorium or display, and settings such as theatre masking or image stretching and/or cropping, respectively) are determined.

The presentation system and its settings are calibrated in step 1602 to identify which regions of the overall image area are obscured. Such calibration techniques are discussed at length by Redmann in the PCT published application WO 2010/096030, "Method and Apparatus for Preparing Subtitles for Display". For example, one calibration procedure involves projecting a coordinate grid on a screen and noting the outermost coordinates that can be observed closest to the corners of the screen. The region interior to these corner coordinates would define the region of the projected image area that is clear, while the region exterior to these corner coordinates will be obscured from view. Generally, the calibration can be conducted for either eye in a stereoscopic mode of operation, or in 2D, by disabling the stereoscopic operation. However, in certain unusual circumstances, it may be necessary to produce a calibration for each eye individually, for instance if the right- and left-eye stereoscopic images are to be projected from substantially different points and, as a result, could potentially have substantially different obscured areas. It is also possible that the projector or display has a different horizontal offset for each of the right- and left-eye images (i.e., the horizontal convergence is flawed, or has been deliberately altered), then the two eyes would be, in effect, differently cropped at the sides.

The result of the calibration is to establish a clear or unobscured area of the image on the presentation system, which may be the projection screen in a specific auditorium or a monitor in a home entertainment system or other viewing devices. Often the clear area is identical for each of the right- and left-eye images, but as pointed out above, in some cases it can be different for the right- and left-images (e.g., when the two images are projected by physically separated projectors).

If method 1600 is used in real-time to make changes to captions' positions as a movie or presentation is playing, then the presentation is started at step 1603. If method 1600 is not used in real-time concurrently with a show or presentation, then pre-processing of the captions takes places at step 1603, e.g., by examining files that contain the content to be played at a later time. The captions or subtitles of these files are then processed according to subsequent steps described below.

In step 1604, a subtitle or caption in the content file is examined, or in real-time throughout the presentation. In step 1605, a comparison is made to determine whether the footprint of the caption extends outside the clear area obtained from step 1602. If there is a single clear area for the right- and left-eye images, the comparison can be made in two separate steps, one for each of the right- and left-eye caption image footprints; or in one step, in which the union or combination of the right- and left-eye caption image footprints is compared with the clear area. If the clear areas for the left- and right-eye images are different, then one implementation can track the clear area separately for each eye's image, and compare the caption's footprint separately for each clear area. Another implementation can compare the combined footprints of the left- and right-caption (i.e., union of the footprints) against the intersection of the left- and right-eye clear areas (i.e., the clear area that is common to both stereoscopic images). The latter is more precise, various combinations of the latter choices may be more economical, yet entirely adequate. Alternatively, one can also compare the clear area with one of the two caption image footprints, plus an extended footprint portion to account for the disparity or offset with respect to the other eye's caption image.

If the comparison shows that the caption footprint(s) lie completely within the clear area, then processing continues by overlaying or compositing the caption into the image, as shown in step 1609 discussed below. Otherwise, one or more caption or subtitle adjustment processes can be performed in step 1606.

One or more of four exemplary subtitle adjustment processes (e.g., processes 1700, 1710, 1720, and 1730 shown in FIGS. 17A-D, respectively) can be provided for use at step 1606. In this embodiment, each process also returns a quality assessment, for example, a utility function that can be used in step 1607 to determine whether the result of a particular subtitle adjustment process would be acceptable. In the descriptions below, each caption adjustment process in step 1606 returns a computed utility function that represents an empirical evaluation of the usability and aesthetic quality of the adjusted subtitle. If the utility function is greater than a predetermined value (which may be the same or different for each different process), the adjustment is acceptable and applied in step 1608. Otherwise, another subtitle adjustment process is tried at step 1606.

In one embodiment, the order in which subtitle adjustment processes are tried or evaluated in step 1606 can be selected to minimize the expected computational cost of finding an adequate or acceptable result. For example, if each subtitle adjustment 'a' is expected to provide acceptable results with likelihood or probability 'p(a)', and the expected computational cost of trying the adjustment is 'c(a)', then evaluating the various processes according to an order of increasing-ratio of c(a)/p(a) (which represents, essentially, cost per unit chance of success) often provides a minimum expected cost. The order of evaluating these processes can be based on empirical evidence or prior experience, and can also be dynamically altered based on results in certain scenes. This does assume that each p(a) is independent of the success or failure for other values of 'a', that is, if one approach fails to produce satisfactory results, that has no effect on the probability of other approaches.

In another embodiment (not shown), each approach to subtitle adjustment is tried or evaluated at step 1606 and the aesthetic utility function values returned are compared against each other (rather than against a predetermined 'good enough' value as in step 1607). The best-performing subtitle adjustment is retained and applied at step 1608. This provides the best adjustment available, but always the worst-case cost. If only one caption adjustment process is selected for use in step 1606, then step 1607 will be omitted (since there is no other alternative process for comparison.)

After an adjustment is made to the subtitle at step 1608, or if it is determined in step 1605 that the subtitle is inside the clear area (and thus no adjustment is needed), the stereoscopic subtitle is composited with the stereoscopic image at step 1609. If method 1600 is being performed in real-time during content presentation, the subtitles are composited into the images, and the resulting composition is presented. If the process is not running real-time, the subtitles are composited into their associated stereoscopic images to produce transformed images, and the results (e.g., as one or more data files subtitles composited into respective images) are stored in one or more memory devices (not shown) for use later.

At step 1610, if it is determined that there are more subtitles to be checked, the method iterates at step 1604. Otherwise, the adjustment method completes at step 1611.

FIGS. 17A-D illustrate different processes or methods that can be used, e.g., in step 1606, to adjust a subtitle or caption to accommodate a reduced clear area for image display such that the resulting subtitle can be displayed in its entirety, e.g., without being obstructed or cropped.

Method 1

Figure 17A:
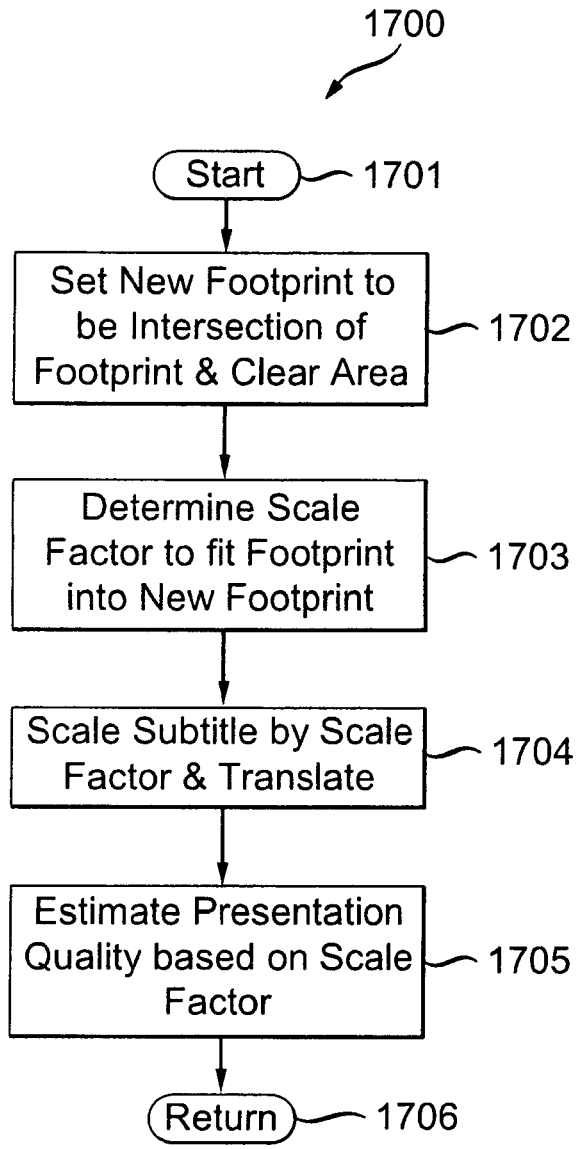
FIG. 17A shows a first embodiment of a subtitle adjustment process.

FIG. 17A shows a process 1700 for in-place scaling caption adjustment. The term "in-place" means that there is no translation or displacement of the caption outside of its original footprint or. This process is initiated at step 1701 with an initial condition that the footprint of the original caption is not wholly contained within the clear area (e.g., as determined from system calibration such as step 1602 in FIG. 16). At step 1702, a new footprint is set to be equal to the intersection of the original footprint and the clear area. At step 1703, a scale factor is determined for applying to the height and width of the original footprint such that the scaled dimensions are sufficiently reduced to fit within the new footprint. In different embodiments, the aspect ratio of the original footprint may be maintained by the reduced caption (i.e., the same scale factor is used for both the height and width), or the aspect ratio may be allowed to vary within a constrained amount.

For instance, in an embodiment where footprints are tracked and compared by their bounding boxes, a caption with a footprint having an original height $H_O$ and width $W_O$, when intersected with the clear area, would produce a new footprint having height $H_N$ and width $W_N$. Note that one can think of a bounding box as a "generous" kind of footprint. An "exact footprint" would be precisely those pixels that are altered by the caption text (including e.g., drop shadows or halo effects) and no others. An expanded footprint would be the dilation by r (minimum relief value) of the exact footprint. In general, a footprint may be a complex, discontinuous, disjointed region. The bounding box version of the footprint simplifies computation and will generally produce similar (though possible different) results.

Figure 18:
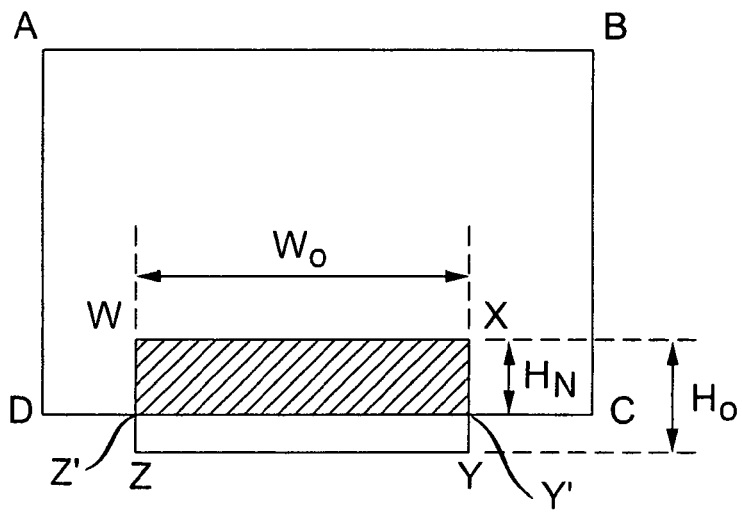
FIG. 18 shows a clear area and parameters of two footprints.

FIG. 18 illustrates a clear area ABCD, an original footprint WXYZ, a new footprint WXY'Z', and their respective parameters. In this case, $W_O = W_N$. A simple scale factor (generally designated by 's') can be determined as the lesser or smaller of a height ratio $H_N/H_O$ (or $s_H$) and a width ratio $W_N/W_O$ (or $s_w$). Since 's' is used for scaling down a caption, it is less than or equal to 1. This computation is repeated for each of the right- and left-eye caption images for the entire presentation. Alternatively, the scale factor can be computed based on the union of the right- and left-eye caption image bounding boxes, but while the height ratio remains the same, the width ratio becomes $(W_N-|D_O|)/(W_O-|D_O|)$, where Do represents the disparity of an object (e.g., as disparity 401 is to rook 101) since for this approach, the original disparity between the right- and left-eye images is retained.

If the aspect ratio of the caption is to be preserved, then the same scale factor 's' is used for both the height and width for scaling the caption at step 1704. If however, the aspect ratio is permitted to vary by a variance 'v', which in one example, might be predetermined to be 30% (the value of v is a matter of policy, though practically, a value of 2 (200%) may become hard to read), then the other axis of the scaled caption (with respect to the axis having the smaller ratio or scale factor) could be scaled from 's' up to s(1+v), with s(1+v) having a maximum of one. For example, if the width of a caption needs to be shrunk to 50% (s=0.5) to be seen in its entirety, it does not necessarily mean that the height has to be scaled by the same amount. The variance 'v' limits the extent to which the height is allowed to be left as it was (if v=0, the height is scaled exactly as the width is). However, it is not desirable to have the height scaled beyond (i.e., larger than) its original value, since that increases the footprint and probably induces negative aesthetic effects.

As an example, assume that a stereoscopic caption is originally 500 pixels wide overall (i.e., including right- and left-eye caption images) and 50 pixels tall, with a 20-pixel disparity (alternatively speaking, the right- and left-eye caption images are 480 pixels each). So, $W_O=500$, $H_O=50$, and $D_O=20$. In a particular presentation environment (e.g., established at step 1601), assume that the clear area determined at step 1602 crops the original footprint of this particular caption by 100 pixels horizontally, but not at all vertically, to produce a new footprint having $W_N=400$ and $H_N=50$ (unchanged). This produces $s_w=(W_N-D_O)/(W_O-D_O)=380/480$, or approximately 0.79, and $s_H=H_N/H_O=1$. If the original aspect ratio is to be retained for scaled captions, the scale factor selected for both the height and width of the caption would be 0.79. However, if the aspect ratio is permitted to vary by up to v=30%, then the scale factor for height could be up to 0.79*(1+v), or about 1.03, which, according to the above constraint (i.e., not scaling the height beyond its original value), would be clamped to 1.0. Were the clear area to have cropped the original footprint of this particular caption by 200 pixels horizontally (instead of 100), then $s_w$ would be 280/480=0.58 (about) and the $s_H$ could be up to 0.58*(1+v), or about 0.76. Note that the case where the original aspect ratio of the caption is retained is the same as setting v=0%.

To apply this subtitle adjustment, the original subtitle is scaled by $s_w$ and $s_H$, as determined in step 1703. A translation is applied to the scaled caption to ensure that it lies wholly within the new footprint, and therefore will be displayed in its entirety, i.e., without being cropped. A good choice for this translation is to leave the subtitle position along any axis or direction unchanged, if there is no reduction in the caption's dimension along that direction (e.g., if the ratio of $H_N/H_O$ is 1, then the vertical position can remain unchanged). If the caption's dimension in a given direction has to be reduced or scaled down, the caption's position along that axis can be set so that the center of the scaled caption would coincide with the center of the new footprint. The application of this scaling and translation can occur at step 1704, or can be delayed until the selection of this specific adjustment is finalized, e.g., at step 1608. By way of clarification, method 1700 takes place within a first pass through step 1606 of FIG. 16, with the test at step 1607 being performed on the estimated quality from step 1705.

If multiple adjustment methods (e.g., shown in FIGS. 17A-D) are available for use in step 1606, then an estimation should be made for a presentation quality value at step 1705 for a first method. If the result from the first method is deemed inadequate at step 1607, then another caption adjustment method will be evaluated in step 1606, with the footprint and subtitle reset to the original location and setting. For example, in the case of in-place scaling caption adjustment process 1700, the presentation quality value for use at step 1705 should be based on the smaller or lesser scale factor (designated by '$s_1$'), i.e., smaller of the two ratios $H_N/H_O$ and $W_N/W_O$. For instance, a caption that is reduced to 50% of its original size produces a poorer quality presentation than a caption that is reduced to 70% of its original size. A utility function, or in this case, quality function, '$q_s$' can be produced, generally by empirical assessment, to ascertain the appropriate relationship between the parameters provided (e.g., smaller scale factor, or other parameters relevant to the specific method) and the presentation quality value. For example, an exemplary function for presentation quality based on the smaller scale factor, represented by '$q_s(s_1)$', can be constructed by considering that a caption at 100% of its original size is ideal. Note that $q_s$ is the "quality function based on scaling" which, for this embodiment, is based on the scale factor that is the lesser or smaller scale value $s_1$, i.e., not s(1+v). In this case, $q_s(1)=1$. Certainly, a caption that is reduced to 0% in its height or width cannot be seen at all, and represents very poor presentation quality, so $q_s(0)=0$. Such a condition will occur if the intersection between the original footprint and the clear area is empty.

However, captions that are scaled so small as to be unreadable also represent a similarly poor presentation quality. So, for certain given font and other circumstances, there is a predetermined scale factor $s_0$ (or a threshold scale value) below which the quality function is zero. Thus, $q_s(s_0)$ is also equal to 0. If $s_0$ is 0.5, this means that at or below a 50% scale factor, the font is unreadable and makes the caption worthless. For such a caption, the quality function '$q_s$' may be expressed in terms of the smaller scale factor and a scale factor below which the caption becomes useless:

$$q_s(s_l, s_0) = \begin{bmatrix} \text{if } (s_l \geq s_0) \rightarrow (s_l - s_0)/(1 - s_0) \\ \text{otherwise} \rightarrow 0 \end{bmatrix} \quad \text{EQ. 3}$$

Here, the bracketed portion represents a conditional equation. If $s_1$ is greater than or equal to $s_0$, then $(s_1-s_0)/(1-s_0)$ is used to compute the result of $q_s$. If $s_1<s_0$ (the otherwise clause), $q_s$ is 0.

This exemplary quality function results in a linear quality function from 0 to 1, for scale factors $s_1$, greater than the threshold scale factor $s_0$ and up to one. The quality function may be different for different fonts. For example, some fonts might not be so restrictive (e.g., a sans-serif, non-italicized, non-bold font), and might be assessed to have an $s_0=0.3$. Likewise, a fancy, cursive font may be very sensitive to scaling and have $s_0=0.9$. In general, $s_0$ will be an empirically determined value, and will be somewhat subjective. Further, the equations presented herein are by way of explanation, and not of limitation.

With the estimate of presentation quality made at step 1705, process 1700 can return at step 1706 (and to step 1607, if appropriate), noting the estimated quality of the proposed changes to the caption.

Method 2

Figure 17B:
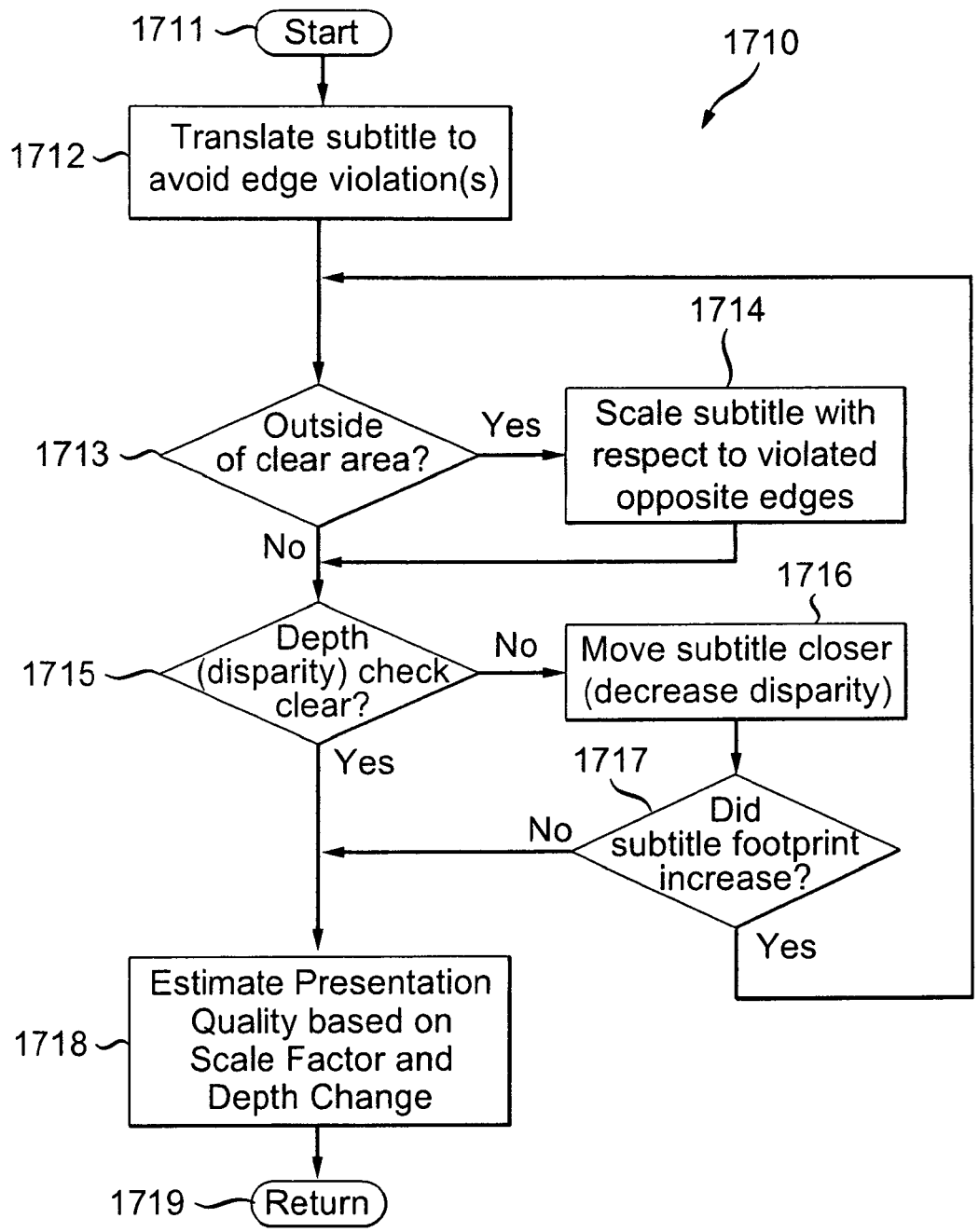
FIG. 17B shows a second embodiment of subtitle adjustment process.

FIG. 17B illustrates a second subtitle adjustment process 1710. Process 1710 allows a subtitle to be translated horizontally and/or vertically to remain within the clear area, with scaling if necessary. Additionally, a check is made as to whether the disparity of any of the objects in the image underlying the new footprint of the relocated subtitle would require the disparity of the subtitle itself to be adjusted (so the subtitle does not end up conflicting with the apparent depth of another object by appearing behind the object that the subtitle overlays).

Process 1710 starts at step 1711, with an initial condition that the footprint of the original caption or subtitle is not wholly contained within the clear area. The edge(s) of the clear area violated by the original subtitle footprint are identified (e.g., as taught by Redmann, WO 2010/096030) and the subtitle is translated by a sufficient amount to overcome these edge violations at step 1712. If at step 1713, the subtitle does not lie entirely within the clear area, e.g., if the subtitle is wider than the clear area, then at step 1714, the subtitle is scaled to fit within the clear area (and as above, the scaling can either retain the original aspect ratio, or modify it in accordance with a predetermined policy).

After step 1714, the disparity of the subtitle is compared against the disparity of the stereoscopic image underlying the new footprint of the translated and possibly scaled subtitle. If the subtitle has a disparity less than or equal to that of the underlying stereoscopic image (i.e., the subtitle appears to be closer to the audience than objects underneath the subtitle), then the subtitle adjustment is considered successful, and processing continues at step 1718.

However, if the adjusted subtitle has a disparity greater than an object it overlays (or within a predetermined minimum disparity difference), the disparity of the stereoscopic subtitle is adjusted at step 1716 to be less than or equal to the minimum disparity of the underlying object (or less than or equal to the minimum disparity of the underlying object less the predetermined minimum disparity difference).

As an example, if as a matter of aesthetic policy, a relocated subtitle could be constrained to always float slightly above the underlying object, the disparity of the subtitle can first be reduced to that of the underlying object, and then reduced a by a small amount (e.g., the predetermined minimum disparity difference), which might be just one pixel. The result of this decrease in disparity is that the adjusted subtitle no longer pose conflicting depth cues with the underlying object(s). If a predetermined minimum disparity difference is used, then the adjusted subtitle clears the underlying object by the apparent depth induced by the predetermined minimum disparity difference (which would typically be small).

In some cases, however, a change in the disparity may result in the new footprint of the stereoscopic subtitle increasing in size. Potentially, this may result in an additional edge violation, or possibly an overlay of an object not previously considered at step 1715. If an increase of the new footprint is detected at step 1717, then the routine iterates back to step 1713. Otherwise, processing continues at step 1718.

Note that judicious use of predetermined or dynamically calculated overcompensation can reduce or eliminate the possibility of a need to loop back to step 1713. Such overcompensation can include, for example, translating a subtitle (in step 1712) by an extra 5 pixels over the minimum required to avoid edge violations; scaling down the subtitle by an extra 5% over the minimum required in step 1714; or in step 1715, when examining a stereoscopic image for the minimum disparity underlying a subtitle footprint, expanding the examined area by an extra 15 pixels horizontally.

At step 1718, an estimate of presentation quality with the modified or adjusted stereoscopic subtitle is made. Similar to step 1705 of FIG. 17A, this quality function should be based, at least in part, on the scale factor (as in exemplary EQ. 3). However, for process 1710, there are also quality effects to be estimated relating to translation and changes in disparity (or depth). Large translations run the risk of obscuring important, or at least interesting, portions of the underlying stereoscopic image. Large changes in disparity may result in the subtitle being distanced (in terms of apparent depth) from the primary plane of interest (e.g., the face of the current speaker). As the original quality equation for $q_s$ based on scaling is used for in-place scaling process 1700, quality equations for $q_t$ and $q_d$, i.e., quality functions based on translation and disparity adjustment, respectively, are suitable candidates for a quality estimate for use with translate, scale, and disparity adjustment process 1710.

$$q_t(t_H, t_V) = \left(1 - \frac{|t_H|}{2}\right)^{\frac{1}{2}} \times \left(1 - \frac{|t_V|}{2}\right) \quad \text{EQ. 4}$$

$$q_d(\partial d, d_\infty) = \left(\frac{1}{2}\right)^{\frac{|\partial d|}{d_\infty}} \quad \text{EQ. 5}$$

$t_H$=horizontal translation (as a fraction of screen width)
$t_V$=vertical translation (as a fraction of screen height)
$\partial d$=change in disparity (in pixels)
$d_\infty$=disparity corresponding to an object appearing at infinity (in pixels) (i.e., the interocular separation)

As with EQ. 3, the form of each of EQS. 4 and 5 provides a positive quality estimate that is less than or equal to 1. For example, in EQ. 4, when given a null translation, $q_t(0,0)=1$. At the other extreme for EQ. 4, a translation from one corner of the image to the other (an improbable 100% translation in each of the horizontal and vertical), produces a non-zero result: $q_t(1,1)$ being equal to about 0.35, since a caption moved completely across the screen, though it may be unaesthetic, is not useless. The caption is still readable (assuming it remains entirely within the clear area).

Furthermore, EQ. 4 has been constructed so that horizontal translation has less effect than a similar proportion of vertical translation since, for reading English, eye movement in the horizontal direction is less intrusive than like-sized vertical translations. Empirical results may be reversed for Japanese and other vertically written languages.

In the form of EQ. 4, the exponent of each of the parenthetic terms (an explicit '½' for the term including $t_H$ and an implicit '1' for the term including $t_V$), allows the importance or contribution of each to be compared relative to each other. The parenthetic terms each have a value between 0 and 1. So any positive, finite value of the exponents will produce results that also lie in the interval between 0 and 1. More specifically, if the exponent is one, the relationship between the translation and the effect on the quality factor is linear. For exponents less than one, differences in small translations will have less effect than the same size difference in larger translations. Conversely, exponents greater than one can be used in other quality functions (i.e., not limited to the specific form shown in EQ. 4) and will produce large effects for small translations, but the effect rolls off as the translation gets larger.

Separately, the denominator in the fraction in each parenthetic term ('2's in example EQ. 4) also affects the maximum reduction in quality value for each of $t_H$ and $t_V$. These constants (the denominators and exponents) can all be adjusted in accordance with empirical assessments of quality to fit the equation so as to improve the estimate. Furthermore, other expressions (different from EQ. 4) can also be used as a measure of the quality $q_t$. It is valuable for the equation to not produce values of $q_t$ that fall outside the range 0 to 1, but this could also be accomplished by clamping to the extent that it is not inherent in the equation itself (e.g., if the given equations do not actually constrain their solutions to lie in the range of 0 to 1, then $q_t$ is set to 0 when the result would be less than 0, and set to 1 when the result would be greater than 1) or by providing equations of a different form.

For example, one alternative form accepts empirically determined floor values or lower limits for quality reduction due to translation (denoted as $q_{minH}$ and $q_{minV}$, respectively, for the translation in horizontal and vertical directions), which ensure that each of axes of translation (or each translation along a specific axis or direction, e.g., along the height or width of the subtitle) can contribute no more than a certain reduction in quality estimate. Shown in EQ. 6 below, when these values are set to $q_{minH}=0$ and $q_{minV}=0$, the equation will produce the same results as EQ. 4, with the parenthetical terms including denominators of 1 (instead of 2, as shown in EQ. 4). However, as $q_{minH}$ and $q_{minV}$ rise to approach 1, the minimum quality, i.e., $Q_t(1, 1)$, estimated by the equation increases.

$$Q_t(t_H, t_V) = \\ \left((1-t_H)^{\frac{1}{2}} \times (1-q_{minH}) + q_{minH}\right) \times \left((1-t_V) \times (1-q_{minV}) + q_{minV}\right) \quad \text{EQ. 6}$$

Still another form of the translation-based quality estimate might treat translation in the horizontal and vertical directions equally, in which the magnitude of the aggregate displacement would provide the quality estimate. It is understood that various forms of equations may be suitable for providing quality estimates, with Equations 4 and 6 providing two examples.

A combination of quality estimates of this form can simply be the product, as shown in EQ. 7, which retains the property of providing a resulting quality estimate between zero and one.

$$q(s_1, s_0, t_H, t_V, \partial d, d_\infty) = q_s(s_1, s_0) \times q_t(t_H, t_V) \times q_d(\partial d, d_\infty)$$

This equation can also be used in process 1700, but since $t_H$, $t_V$, and $\partial d$ would all be zero (since process 1700 provides no translation and no disparity adjustment), the resulting quality estimate should be the same as that of EQ. 3.

Similar to the subtitle adjusting step 1704 in process 1700, the actual adjustments occurring at step 1714 and step 1716 can either be performed in real-time during presentation, or the adjustments can be noted and performed later.

Method 3

Figure 17C:
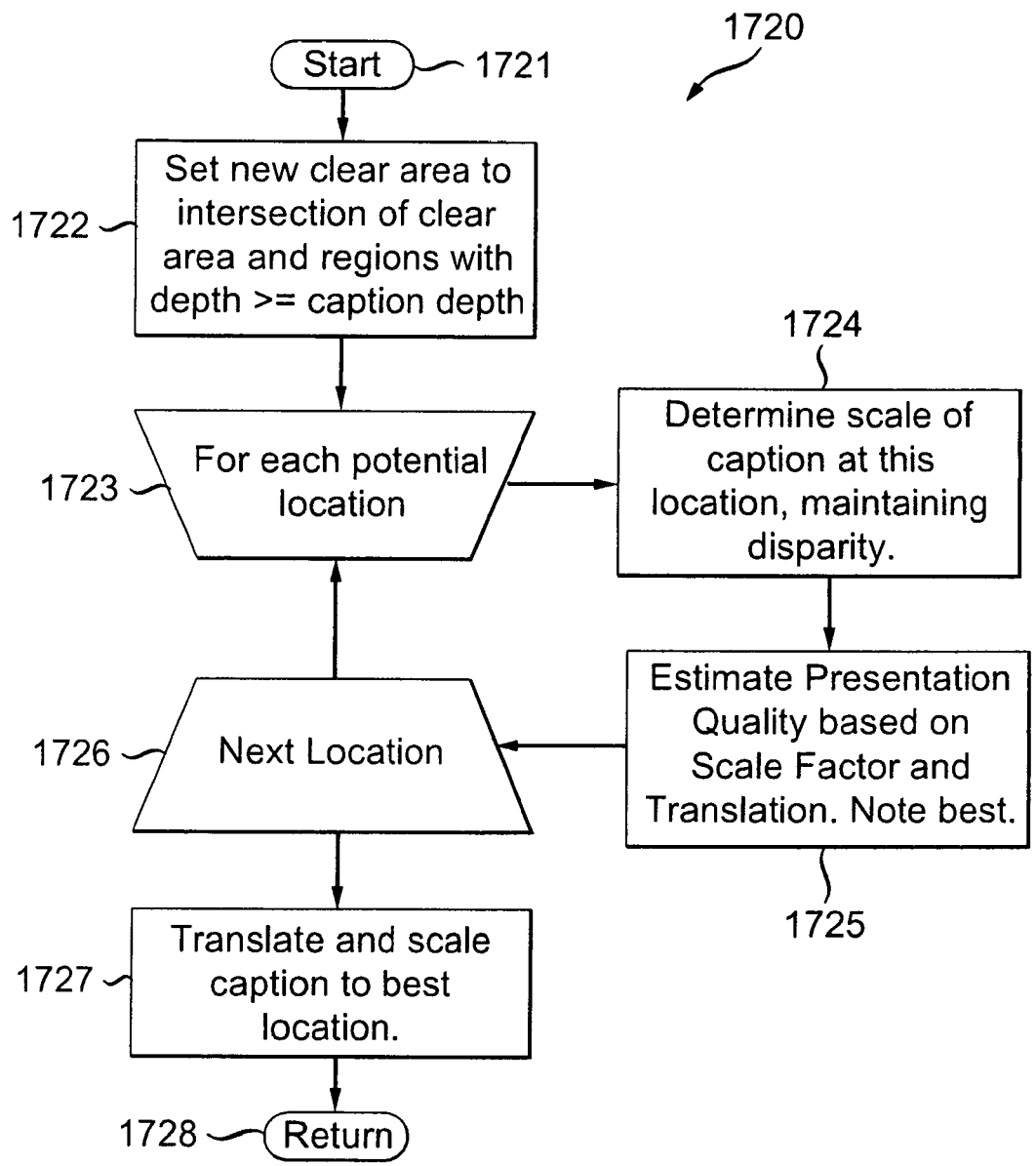
FIG. 17C shows a third embodiment of subtitle adjustment process.

FIG. 17C illustrates a third subtitle or caption adjustment process 1720. Process 1720 allows a caption to be translated, but only into regions that are both visible (i.e., not in any area that may be masked) and for which the underlying objects would not have a smaller disparity (i.e., where the objects in the image would appear to be behind the caption).

Process 1720 starts at step 1721, with an initial condition that the footprint of the original caption is not wholly contained within the clear area. A depth map of the stereoscopic image pair underlying the caption is either provided with stereoscopic images (e.g., as metadata), or is derived directly from the stereoscopic images. At step 1722, the clear area (e.g., from step 1602 in FIG. 16) is intersected with the regions of the stereoscopic pair having a disparity (or apparent depth) greater than or equal to that of the caption, to define a new clear area suitable for placement of the caption at its current disparity.

In steps 1723, 1724, 1725 and 1726 (referred to as a loop in the process), one or more potential locations suitable for placement of the caption are examined, and scale factor(s) and quality estimates or quality functions based on the scale factor and translation of the caption (i.e., translation amount needed to position the original caption at the location under examination) are determined for each location. These potential locations may be exhaustively searched (e.g., by rastering through the clear area row-by-row, and pixel-by-pixel), sparsely searched (e.g., by rastering through the clear area according to a predetermined procedure, such as skipping every tenth row and column), or randomly searched (e.g., by picking a random row and column within the clear area for each iteration). In this context, the "translation" can be considered as the raster in (x, y) space being traversed by the loop (testing each possible location), with the translation amount being given by the current {x,y} value of the loop minus the {x,y} position of the original caption.

For each potential location selected at step 1723, a determination is made in step 1724 for a scale factor that produces the largest rectangle having the aspect ratio of the caption that can be placed at the location being examined. If the rectangle is at least as large as the caption's footprint, then the scale factor is set to one. Otherwise, the scale factor is set to a ratio of the size (linear dimension, e.g., height or width) of the largest rectangle to the footprint of the caption. This scale factor represents the amount to which the caption must be reduced to fit in the clear area at the current location. In one example, the step can be adapted for providing two scale factors along two different axes or directions. First, a determination is made for a scale factor that works for both axes. Then for the over-constrained axis, determine an allowable re-expansion up to the limit of the variance 'v'. The caption may still be degraded by being reduced in size by the scale factor 's', but if varying the aspect ratio of the caption is indicated by a non-zero 'v', then perhaps some readability can be restored by a re-expansion of the other axis. Such an option can be accommodated by using an appropriate utility function.

Once the scale factor (or factors) has been determined at step 1724, then a quality estimate can be made at step 1725, e.g., with EQ. 7 (realizing that $\partial d=0$, since the disparity is being maintained). If the quality estimate is better (i.e., higher) than prior estimates for this caption, then the estimated quality is retained as the best so far, as is the location and scale factor.

Note that efficiencies can be gained if a partial quality estimate, e.g., based on translation as in EQ. 4, is already known (prior to step 1724) to be inferior to the best quality estimate seen so far (i.e., quality estimate from the translation done in process 1710 is compared with what is being done in process 1720). For such locations, the scaling determination at step 1724 and more elaborate quality estimation at step 1725 can be skipped, e.g., by using other optimization steps.

At step 1726, a determination is made as to whether additional locations should be examined. If the loop is rastering through the possible locations, whether exhaustively or sparsely, and if possible locations remain, the process returns to step 1723. However, in some cases, not all locations need to be examined. For example, if the examination of locations is arranged to start with test locations near the original position of the caption and proceed to examine locations farther away, then as soon as the quality estimate of EQ. 4 exceeds the best quality estimate made at step 1725, the loop may terminate, since all locations having a greater translation will have poorer quality estimates from EQ. 7. (Recall that EQ. 4 estimates the quality of a relocated subtitle undergoing pure translation, returning a value between 0 (useless) and 1 (ideal), inclusive. EQ. 7 employs EQ. 4 as a term in a product, with the other terms being based on scaling and changes to disparity. These other terms are similarly constrained to return values between 0 and 1. Thus, once any single term of EQ. 7 falls below the best value found for EQ. 4, the whole of EQ. 7 cannot beat the result of EQ. 4.)

At step 1727, the caption is translated and scaled according to the best quality estimate from step 1725, while maintaining the same disparity of the caption. As discussed earlier, the candidate translations of caption occur at step 1723 by progressively rastering through the clear area, and a scaling is determined at 1724, if needed (scale factor is 1 if no scaling is needed). At step 1728, process 1720 returns the best quality estimate found, along with the adjusted caption, e.g., to step 1606 in method 1600 (or, alternatively, with the translation and scale factor needed for the adjustments, if the implementation forgoes the adjustment at step 1727).

Method 4

Figure 17D:
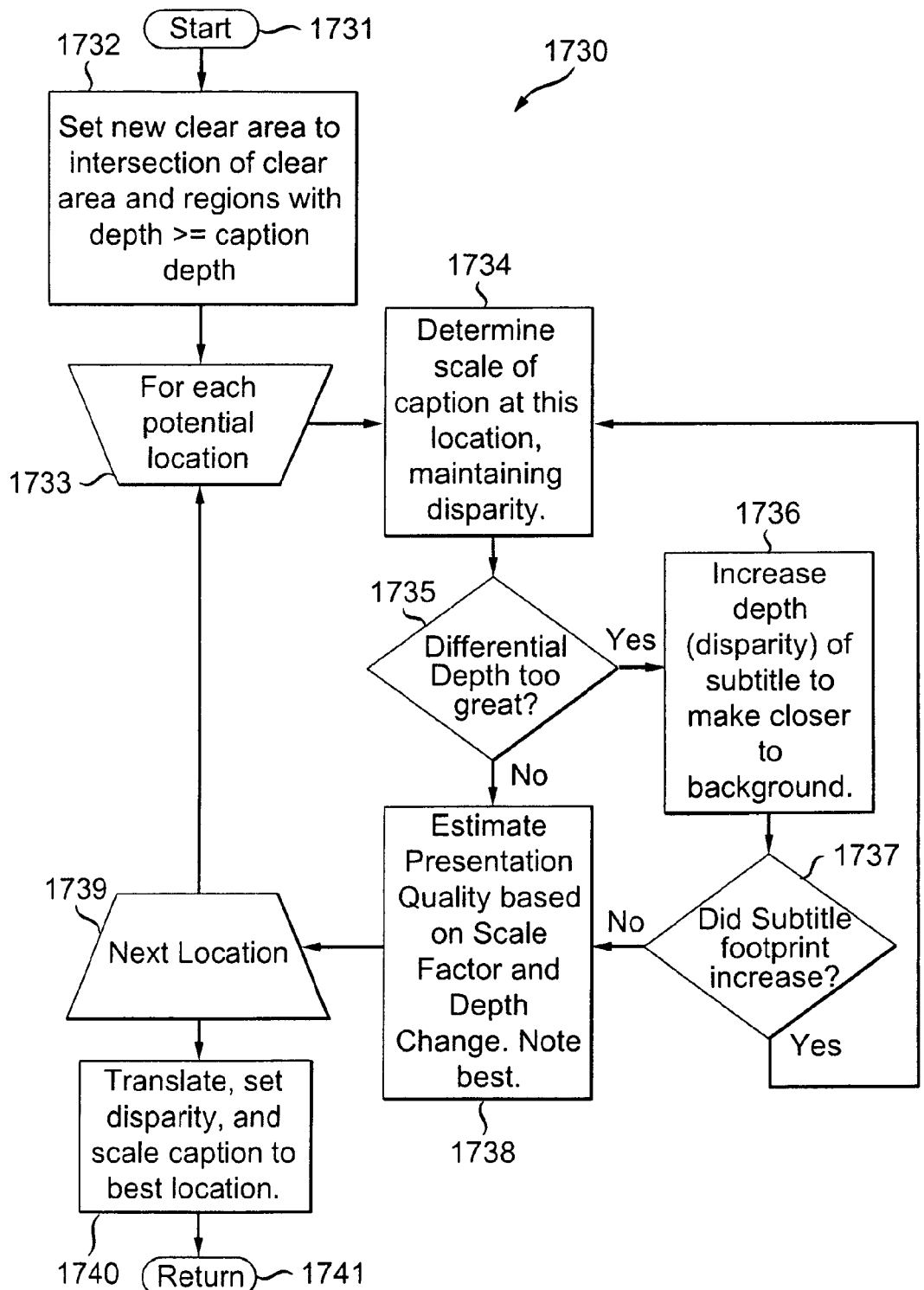
FIG. 17D shows a fourth embodiment of subtitle adjustment process.

FIG. 17D shows a fourth caption adjustment process 1730 that translates and scales a caption as in process 1720 of FIG. 17C (thus steps 1731, 1732, 1733, 1734 and 1739 in FIG. 17D correspond to steps 1721, 1722, 1723, 1724 and 1726 in FIG. 17C). However, process 1730 introduces a test at step 1735 to determine whether the difference in disparity between the portion of the stereoscopic images and the adjusted caption footprint (which are assured to be no less than that of the caption by step 1732) is actually too large, e.g., larger than a predetermined value that may be based on aesthetic preference. FIGS. 13 and 15 show an example where a disparity difference between the caption 1310 and the underlying portion of the stereoscopic image (actor 603) is considered too large, so that caption 1310 in FIG. 15 is located much farther in front of actor 603. If this excess disparity differential is detected at step 1735, then the disparity of the caption is adjusted at step 1736 so as to be suitably close to the disparity of the elements or objects in the background image (e.g., resulting in caption 1410 having a disparity that is closer to that of actor 603). In step 1737, a determination is made to see if the footprint of the disparity-adjusted caption has increased. If so, processing returns to step 1734 to re-determine an appropriate scale factor, which may be needed for further optimization.

However, if it is determined in step 1737 that the footprint has not increased, or if it is determined at step 1735 that the underlying disparity is not too dissimilar to that of the caption, then a quality estimate is made at step 1738, of which the best is noted, along with the associated translation, scale factor, and disparity adjustment.

At step 1739, if there is still another location to be examined for possible placement of the caption, processing return to step 1733. Otherwise, the caption can be adjusted in accordance with the best findings noted at step 1738 (or this can be done later). Process 1730 exits at step 1741, returning the quality estimate and adjusted caption, e.g., to step 1606 of method 1600 (or instructions for making the appropriate adjustment).

The above methods can be applied or adapted for caption placements in one or more frames of a stereoscopic presentation. In some embodiments, the process of examining the underlying stereoscopic image for placement of a caption may include examining more than just the stereoscopic image for a single frame. Captions are generally displayed on-screen for more than one frame, and some practitioners may choose to keep a caption at the same location once it is displayed. In such cases, a caption placement should be made by considering all stereoscopic frames that will underlay the caption for the duration it is displayed. One treatment of disparity information that addresses this issue is for a disparity map (or depth map) of a stereoscopic image to be summarized as the minimum value of disparity (i.e., nearest apparent depth) for each area (e.g., a pixel or a larger area) taken over at least the entire duration in which the caption is to be displayed. The area to be examined for minimum disparity corresponds to a region that overlaps with the caption or its footprint. In many cases, such a summary of disparity map would be adequately represented if disparities are only taken or sampled occasionally. For example, disparity information can be treated by determining a minimum disparity value (on a per pixel or larger basis) over a certain time duration, e.g., the display interval of the caption, for the corresponding number of stereoscopic images or frames to be displayed with the caption. Often, in slowly changing scenes, such information does not require frequent updating, and there is no need to compute the disparity for each frame, even if disparities are delivered continuously to allow such computation. However, for fast moving scenes (e.g., in sports or action movies), there will be sequences where every frame (corresponding to a different stereoscopic image) should be examined to ensure that disparity minima are not overlooked.

Finally, embodiments of the present methods have been presented as being applicable to modifying 3D captions and subtitles that have an originally set disparity and location in the stereoscopic image. However, these embodiments are also applicable to adapting 2D caption and subtitle placements, with the simple presumption that the initial disparity is set to some predetermined value (e.g., zero), or to the minimum disparity (e.g., nearest apparent depth) of the stereoscopic image overlaid by the caption's footprint. In this way, captions created for a 2D presentation can be easily adapted for a 3D presentation of the same content.

The processes in FIGS. 17A-D are illustrative of different approaches or procedures that can be used for automatically processing (as opposed to manual processing) the captions or subtitles (e.g., text and/or graphics) for use in a method for 3D image or content presentation. In these processes, one or more parameters associated with a caption, e.g., position, dimension (width and/or height), and disparity or apparent depth, are adjusted so that the caption can be displayed within a certain area of a display device (e.g., a visible area of a theater screen, display monitors of televisions, computers, cell phones, or other mobile devices), without being obstructed or masked, while providing the caption at a certain disparity or apparent depth with respect to one or more objects in the 3D image or content. For example, by adjusting the caption's disparity according to certain relationship to those of the object(s) in the proximity of the caption, conflicting depth cue information to a viewer can be avoided, resulting in improved viewing experience.

Thus, the method for 3D content presentation generally involves determining an area suitable for subtitle display (may be referred to as a predetermined area, or a clear area), and determining whether a subtitle (or its footprint) with given initial position, dimensions and/or disparity would lie within that area. If not, the subtitle is adjusted in at least one of its position, dimensions and/or disparity according to one or more procedures. For example, its position can be adjusted by translating the subtitle by a certain amount in at least one direction in the plane of the display, and its dimensions can be adjusted by applying at least one scale factor based on the display area and the subtitle's footprint. The caption's disparity can be adjusted by comparing with the disparities of at least one image of an object overlaying or overlapping the scaled and/or translated subtitle, and adjusted to avoid depth perception conflicts with one or more objects in the image, or to provide a more aesthetically pleasing 3D presentation. The scale factor, amount of translation, and disparity change can also be referred to as adjustment information, which is used to process a subtitle for use in stereoscopic presentation. The processed or adjusted subtitle is evaluated according to one or more predetermined criteria, which can include a quality measure (e.g., using a quality function), before being composited into a 3D image or content for display.

One aspect of the invention provides a computer readable medium (e.g., memory, storage device, removable media, and so on) with specific program instructions stored thereon which, when the instructions are executed by one or more processors, will cause a method to be implemented such as described above according to embodiments of the present principles.

Another aspect of the present invention provides a system for implementing the methods and processes discussed herein, e.g., by providing one or more storage or memory devices with stored algorithms or instructions that, when executed by one or more processors in the system, will cause the method and/or processes to be implemented. One example of such a system is a digital cinema server with processors specifically programmed to perform various steps of the method/processes discussed above, e.g., for determining a clear area for subtitle display, playing out of a digital content file, examining one or more subtitles for overlap with the clear area, assessing or evaluating one or more subtitle adjustment processes in accordance with established rules or criteria, and presenting the adjusted subtitle for display with 3D content.

Figure 19:
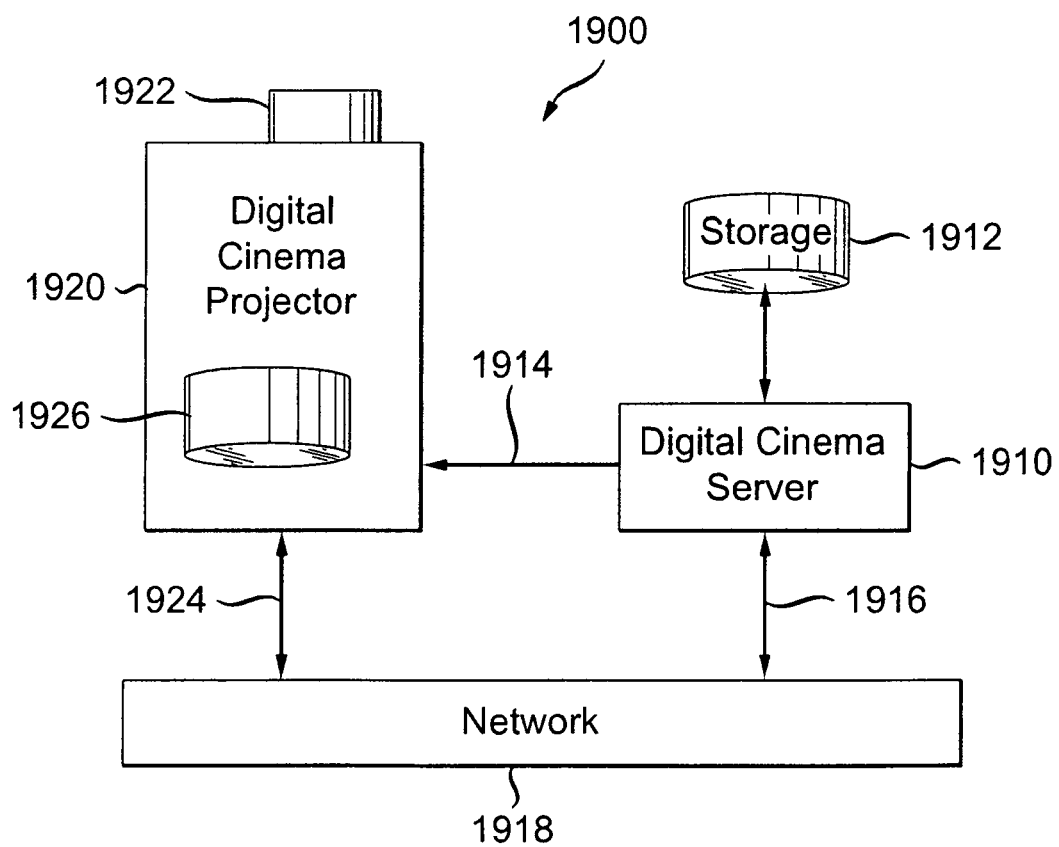
FIG. 19 shows a system for implementing embodiments of the present principles.

FIG. 19 depicts a block diagram illustrating one implementation of the present invention. Digital cinema system 1900 includes a digital cinema server 1910 and a digital cinema projector 1920 suitable for presenting stereoscopic images. Digital cinema server 1910, which has at least read access to a storage device 1912, is configured for reading a composition from storage device 1912 and decoding stereoscopic picture and audio essence. Picture essence and timing information relating to the showing of stereoscopic subtitles are provided to digital cinema projector 1920 over connection 1914, which may be a one-way or two-way communication path. Digital cinema projector 1920 generates a stereoscopic image from the stereoscopic picture essence and projects the resulting images through lens 1922 onto a screen (not shown) in an auditorium. Audio essence is provided by digital cinema server 1910 to an audio reproduction chain (not shown), which delivers the audio component associated with or accompanying the stereoscopic picture essence to the audience in the auditorium.

In most present day configurations, projector 1920 is notified of the presence of corresponding subtitle essence in storage 1912 by digital cinema server 1910. The notification can be communicated to the projector 1920 through network 1918, to which both projector 1920 and cinema server 1910 are connected, e.g., via respective connections 1924 and 1916. Subsequently, during the playout of a composition, projector 1920 fetches upcoming subtitles from server 1910 through network 1918. However, the system may also be configured so that the notification and/or subtitles can be sent via connection 1914.

In the present invention, each stereoscopic subtitle (e.g., subtitle 510) so fetched is checked against the calibration data entered into storage 1926 to determine if a transformation of the subtitle, e.g., translation and/or scaling, etc., is required. Any necessary transformation is made before the subtitle is composited with the image formed from the picture essence.

As known to one skilled in the art, a subtitle may be provided in different forms in a subtitle file. If a subtitle is provided in a form of "timed text", the subtitle will need to be rendered before it can be projected (whether or not composited). However, if the subtitle is provided in a "subpicture" form, it can simply be projected (whether or not composited). In the context of this discussion, it is understood that a projected image of a subtitle refers to both scenarios above, regardless of whether the subtitle is first rendered prior to projection.

In an alternative embodiment, the manipulation of the stereoscopic subtitle and composition with the stereoscopic image may be performed by digital cinema server 1910 and provided to projector 1920, ready to be displayed.

In still another embodiment (not shown), suitable for use in a home, a consumer device, including a set-top box or DVD player may perform the manipulation of subtitles and composition with the stereoscopic images for display on a 3D-capable monitor (i.e., one able to display stereoscopic images). Alternatively, the manipulation of subtitles and composition with the stereoscopic image may be wholly performed by a computer within the 3D-capable monitor.

While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for preparing subtitles for a stereoscopic presentation, comprising:
    processing a subtitle according to adjustment information; and
    compositing the processed subtitle into at least one stereoscopic image to produce at least one transformed stereoscopic image for stereoscopic presentation;
    comparing a footprint of the subtitle with a predetermined area of the at least one stereoscopic image;
    if any portion of the footprint is outside the predetermined area, determining the adjustment information for applying to the subtitle to produce an adjusted subtitle with an adjusted footprint lying completely inside the predetermined area;
    translating the subtitle to reduce the portion of the subtitle lying outside the predetermined area;
    if any portion of a footprint of the translated subtitle lies outside the predetermined area, applying a scale factor to the translated subtitle so that the scaled-down translated subtitle is completely inside the predetermined area; and
    adjusting the disparity of the translated, and optionally scaled-down, subtitle to be no greater than a minimum disparity of an object appearing within the adjusted footprint of the disparity-adjusted subtitle.

2. The method of claim 1, further comprising:
    if the adjusted footprint has any portion outside the predetermined area, further scaling down the disparity-adjusted subtitle, and adjusting the disparity of the further scaled-down subtitle to be no greater than the minimum disparity of any object within the footprint of the further-adjusted subtitle.

3. The method of claim 1, further comprising:
    defining an intersection area between the predetermined area and regions of the at least one stereoscopic image; wherein disparities of objects in the regions are at least equal to a disparity of the subtitle; and
    applying a scale factor and a translation amount to the subtitle to produce a scaled-down and translated subtitle within the intersection area;
    wherein the scale factor and the translation amount are selected according to a predetermined quality criterion.

4. The method of claim 3, further comprising:
    changing the scaled-down and translated subtitle to an adjusted disparity that is within a predetermined amount from disparities of other objects in the intersection area.

5. The method of claim 4, wherein the adjusted disparity of the subtitle is not greater than the disparities of the other objects in the intersection area.

6. The method of claim 1, wherein the at least one stereoscopic image is a plurality of images.

7. The method of claim 6, wherein the plurality of stereoscopic images represent a sequence of images for presentation over a time duration.

\* \* \* \* \*